United States Patent
Mendell et al.

(10) Patent No.: US 11,622,156 B1
(45) Date of Patent: Apr. 4, 2023

(54) SYSTEMS AND METHODS FOR SYNCHRONIZING CLIENT DATA STRUCTURES WITH BROADCASTER EVENTS

(71) Applicant: DraftKings, Inc., Boston, MA (US)

(72) Inventors: Jordan Mendell, Boca Raton, FL (US); Edward Zaleski, New Berlin, WI (US); Ethan Haskell, Chelsea, MA (US)

(73) Assignee: DraftKings, Inc., Boston, MA (US)

( * ) Notice: Subject to any disclaimer, the term of this patent is extended or adjusted under 35 U.S.C. 154(b) by 0 days.

(21) Appl. No.: 17/683,930

(22) Filed: Mar. 1, 2022

(51) Int. Cl.
| | |
|---|---|
| G07F 17/32 | (2006.01) |
| G06K 9/00 | (2022.01) |
| G06Q 20/40 | (2012.01) |
| H04N 21/478 | (2011.01) |
| H04N 21/45 | (2011.01) |
| H04N 21/2187 | (2011.01) |

(52) U.S. Cl.
CPC ..... *H04N 21/4781* (2013.01); *G07F 17/3237* (2013.01); *G07F 17/3288* (2013.01); *H04N 21/2187* (2013.01); *H04N 21/4532* (2013.01)

(58) Field of Classification Search
CPC ............. G07F 17/3211; G07F 17/3223; G07F 17/323; G07F 17/3239; G07F 17/326; G07F 17/3262; G07F 17/3288; G07F 17/34; G06Q 50/34
See application file for complete search history.

(56) References Cited

U.S. PATENT DOCUMENTS

| | | | | |
|---|---|---|---|---|
| 2016/0189483 | A1* | 6/2016 | Ballman | G06Q 50/34 463/28 |
| 2019/0147702 | A1* | 5/2019 | Malek | G07F 17/3255 463/25 |
| 2022/0270446 | A1* | 8/2022 | Inamdar | G06Q 20/401 |

* cited by examiner

*Primary Examiner* — Lawrence S Galka
(74) *Attorney, Agent, or Firm* — Foley & Lardner LLP

(57) ABSTRACT

Systems and methods for synchronizing client data structures with session events are disclosed. The system can establish a session responsive to a request from a host client device associated with a host player profile. The system can configure the host player profile to share records of events performed via the host player profile during the session, and can receive requests to join the session, each request associated with a respective viewer player profile. The system can receive a request from a viewer to permit automatic population of records corresponding to events performed via the host player profile during the session. The system can detect an event performed via the host player profile during the session, and generate a record corresponding to the event in the viewer player profile, which is used to enable performance of a corresponding event having the same event parameters via the viewer player profile.

18 Claims, 12 Drawing Sheets

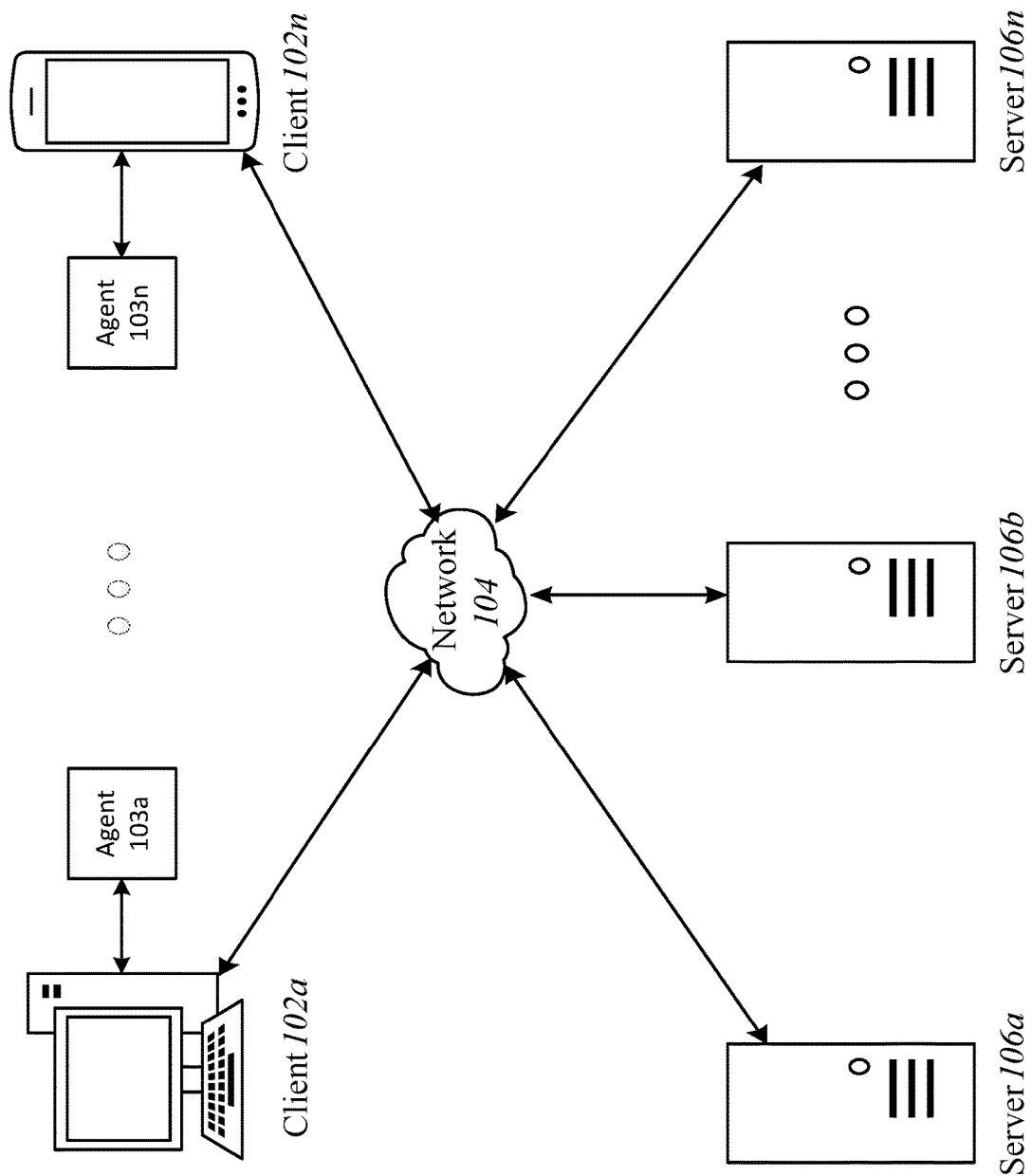

SYSTEMS AND METHODS FOR SYNCHRONIZING CLIENT DATA STRUCTURES WITH BROADCASTER EVENTS

BACKGROUND

Content management systems allocate and utilize a large amount of computing resources to transmit content to a very large number of remote computing devices. Similarly, remote computing devices also allocate and use a lot of computing resources to receive and display the content received from the content management systems. In the case of mobile devices where memory, processing power and power are all finite resources, the receipt and display of content that is not contextually relevant to a user can adversely affect the device's performance and life as well the overall user experience. As such, content management systems should utilize appropriate resource management policies to reduce the amount of contextually irrelevant content being delivered to the remote computing devices.

SUMMARY

The present disclosure relates to one or more systems and methods for synchronizing client data structures with session events. The session processing system described herein can both establish sessions for various broadcasters (sometimes referred to herein as "hosts"), and can manage and monitor events that occur during the session. The session can be a live session in which actions or events performed by a host using an application platform are synchronized across a number of remote computing systems corresponding to view profiles. Records corresponding to the events can be generated in corresponding viewer profiles that include corresponding permissions. Generally, the systems and methods described herein improve upon conventional communication systems by reducing the amount of bandwidth required to synchronize records. In conventional systems, individual remote devices must both request and update their corresponding profiles when events are detected and displayed at the remote computing system. Using the techniques described herein, the session processing system can automatically monitor events that occur during sessions, and generate records in appropriate viewer player profiles without requiring user input. This reduces the overall communication overhead to the system, and therefore operates as an improvement over conventional live session systems.

At least one aspect of the present disclosure relates to a method for synchronizing client data structures with session events. The method may include establishing a session in response to a request from a host client device associated with a host player profile. The request may identify the host player profile as a host of the session. The method may include configuring the host player profile to share records of events performed via the host player profile during the session. The method may include receiving, from a plurality of viewer client devices, a plurality of requests to join the session. Each request may be associated with a respective viewer player profile. The method may include receiving, from a viewer client device of the plurality of viewer client devices, a request to permit automatic population of records corresponding to events performed via the host player profile during the session. The method may include detecting an event performed via the host player profile during the session. The event may identify a plurality of event parameters. The method may include transmitting a content item identifying the event for presentation in a user interface of the session at the plurality of viewer client devices. The method may include generating, in the viewer player profile, a record corresponding to the event responsive to determining that the viewer player profile includes an indication to permit automatic population of records. The record used to enable performance of a corresponding event may have the plurality of event parameters via the viewer player profile.

In some implementations, the request from the host client device can include an indication of a session duration. In some implementations, configuring the host player profile can include configuring the host player profile to share the records of events performed via the host player profile during the session for the session duration. In some implementations, the method can include terminating the session responsive to detecting that the session duration has expired. In some implementations, the request to permit automatic population of the records can include an indication that corresponding events are to be performed responsive to automatic populating of the records.

In some implementations, the method can include maintaining a feed of one or more content items including the content item. In some implementations, the one or more content items each can correspond to a respective event performed via the host player profile during the session. In some implementations, the method can include transmitting the feed of one or more content items to an additional client device associated with an additional player profile responsive to the additional player profile joining the session as a viewer. In some implementations, the method can include updating a data structure associated with the session to identify the respective viewer player profile of each of the plurality of viewer client devices.

In some implementations, the method can include receiving, from the viewer client device, a request to leave the session. In some implementations, the method can include updating the viewer player profile to remove the indication to permit automatic population of records corresponding to events performed via the host player profile during the session. In some implementations, the method can include receiving an event parameter limit corresponding to a first event parameter of the plurality of event parameters. In some implementations, generating the record corresponding to the event in the viewer player profile can further include generating the record to enable performance of the corresponding event based on the event parameter limit. In some implementations, the method can include detecting a change to a first parameter of the plurality of event parameters of the corresponding event. In some implementations, the method can include transmitting, to the viewer client device, a change notification that indicates the change in the first parameter of the plurality of event parameters.

At least one the aspect of the present disclosure relates to a system for synchronizing client data structures with session events. The system can include one or more processors coupled to a non-transitory memory. The system can establish a session in response to a request from a host client device associated with a host player profile. The request can identify the host player profile as a host of the session. The system can configure the host player profile to share records of events performed via the host player profile during the session. The system can receive, from a plurality of viewer client devices, a plurality of requests to join the session. Each request can be associated with a respective viewer player profile. The system can receive, from a viewer client device of the plurality of viewer client devices, a request to permit automatic population of records corresponding to events performed via the host player profile during the session. The system can detect an event performed via the host player profile during the session. The event can identify a plurality of event parameters. The system can transmit a content item identifying the event for presentation in a user interface of the session at the plurality of viewer client devices. The system can generate, in the viewer player profile, a record corresponding to the event responsive to determining that the viewer player profile includes an indication to permit automatic population of records. The record used to enable performance of a corresponding event can have the plurality of event parameters via the viewer player profile.

In some implementations, the request from the host client device can include an indication of a session duration. In some implementations, configuring the host player profile can include configuring the host player profile to share the records of events performed via the host player profile during the session for the session duration. In some implementations, the system can terminate the session responsive to detecting that the session duration has expired. In some implementations, the request to permit automatic population of the records can include an indication that corresponding events are to be performed responsive to automatic populating of the records. In some implementations, the system can maintain a feed of one or more content items including the content item. In some implementations, the one or more content items each can correspond to a respective event performed via the host player profile during the session.

In some implementations, the system can transmit the feed of one or more content items to an additional client device associated with an additional player profile responsive to the additional player profile joining the session as a viewer. In some implementations, the system can update a data structure associated with the session to identify the respective viewer player profile of each of the plurality of viewer client devices. In some implementations, the system can receive, from the viewer client device, a request to leave the session. In some implementations, the system can update the viewer player profile to remove the indication to permit automatic population of records corresponding to events performed via the host player profile during the session.

In some implementations, the system can receive an event parameter limit corresponding to a first event parameter of the plurality of event parameters. In some implementations, generating the record corresponding to the event in the viewer player profile can further include generating the record to enable performance of the corresponding event based on the event parameter limit. In some implementations, the system can detect a change to a first parameter of the plurality of event parameters of the corresponding event. In some implementations, the system can transmit, to the viewer client device, a change notification that indicates the change in the first parameter of the plurality of event parameters.

At least one other aspect of the present disclosure is directed to a method for generating session interfaces based on session events and player profile attributes. The method can be performed, for example, by one or more processors coupled to a non-transitory memory. The method can include maintaining a plurality of active sessions each identifying a respective host player profile, each of the plurality of active sessions associated with one or more session attributes. The method can include receiving, from a client device associated with a player profile, a request for a list of active sessions. The method can include identifying a subset of the plurality of active sessions based on the one or more session attributes of each of the plurality of active sessions. The method can include ranking the subset of the plurality of active sessions based on a historic record of events performed via the respective host player profile of each active session of the subset, and based on one or more player attributes of the player profile. The method can include generating a personalized session interface having the subset of the plurality of active sessions arranged according to the ranking. The method can include providing, to the client device, the personalized session interface to cause the client device to display a list of the subset of the plurality of active sessions according to the ranking.

In some implementations, the one or more session attributes of the plurality of active sessions include an identifier of an event type. In some implementations, identifying the subset of the plurality of active sessions is further based on a match between the event type and an event type of a previous event performed using the player profile. In some implementations, the request further comprises an identifier of an event type. In some implementations, identifying the subset of the plurality of active sessions further comprises identifying the subset of the plurality of active sessions that corresponding to the identifier of the event type.

In some implementations, identifying the subset of the plurality of active sessions is further based on the one or more player attributes of the player profile. In some implementations, the personalized session interface is generated to further include a number of viewers of each active session of the subset. In some implementations, the historic record of events comprises one or more previous events performed by the respective host player profile when hosting a previous session. In some implementations, the historic record of events comprises one or more previous events performed by the respective host player profile when hosting an active session of the subset.

In some implementations, the method can include establishing a session in response to a request from a host client device associated with a host player profile. In some implementations, the method an include updating, by the one or more processors, the plurality of active sessions to include the session. In some implementations, identifying the subset of the plurality of active sessions further comprises identifying the subset of the plurality of active sessions that are indicated in the player profile. In some implementations, the method can include receiving, from the client device, a request to join a selected active session of the subset. In some implementations, the method can include updating the selected active session to include the player profile as a viewer in response to the request.

At least one other aspect of the present disclosure is directed to a system for generating session interfaces based on session events and player profile attributes. The system can include one or more processors coupled to a non-transitory memory. The system can maintain a plurality of active sessions each identifying a respective host player profile, each of the plurality of active sessions associated with one or more session attributes. The system can receive, from a client device associated with a player profile, a request for a list of active sessions. The system can identify a subset of the plurality of active sessions based on the one or more session attributes of each of the plurality of active sessions. The system can rank the subset of the plurality of active sessions based on a historic record of events performed via the respective host player profile of each active session of the subset, and based on one or more player attributes of the player profile. The system can generate a personalized session interface having the subset of the plurality of active sessions arranged according to the ranking. The system can provide, to the client device, the personalized session interface to cause the client device to display a list of the subset of the plurality of active sessions according to the ranking.

In some implementations, the one or more session attributes of the plurality of active sessions include an identifier of an event type. In some implementations, the system can identify the subset of the plurality of active sessions is further based on a match between the event type and an event type of a previous event performed using the player profile. In some implementations, the request further comprises an identifier of an event type. In some implementations, the system can identify the subset of the plurality of active sessions that corresponding to the identifier of the event type.

In some implementations, the system can identify the subset of the plurality of active sessions further based on the one or more player attributes of the player profile. In some implementations, the personalized session interface is generated to further include a number of viewers of each active session of the subset. In some implementations, the historic record of events comprises one or more previous events performed by the respective host player profile when hosting a previous session. In some implementations, the historic record of events comprises one or more previous events performed by the respective host player profile when hosting an active session of the subset.

In some implementations, the system can establish a session in response to a request from a host client device associated with a host player profile. In some implementations, the system can update the plurality of active sessions to include the session. In some implementations, the system can identify the subset of the plurality of active sessions that are indicated in the player profile. In some implementations, the system can receive, from the client device, a request to join a selected active session of the subset. In some implementations, the system can update the selected active session to include the player profile as a viewer in response to the request.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. It will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect. As used in the specification and in the claims, the singular form of 'a', 'an', and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 1A is a block diagram depicting an embodiment of a network environment comprising a client device in communication with a server device, in accordance with one or more implementations;

DETAILED DESCRIPTION

Figure 1B:
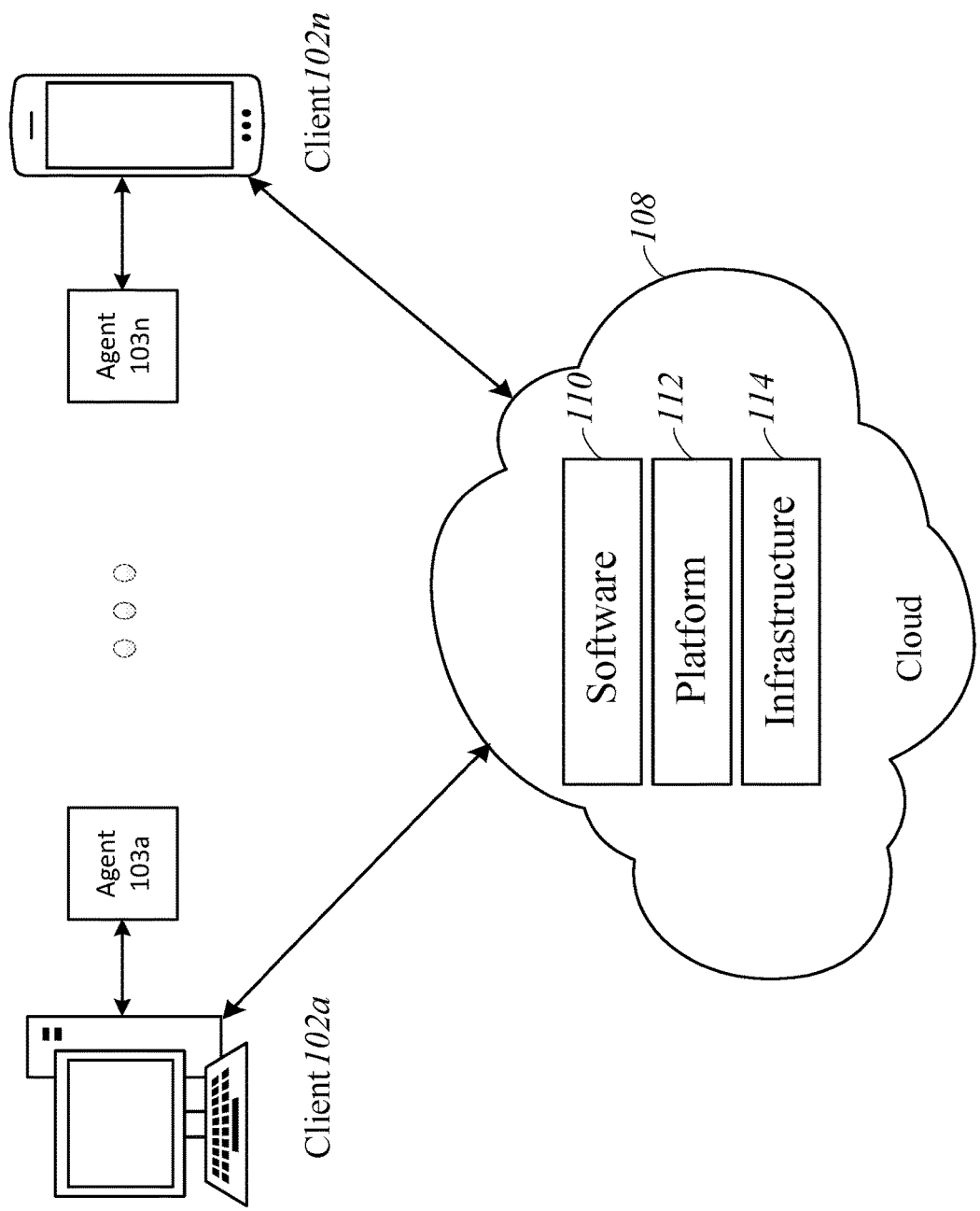
FIG. 1B is a block diagram depicting a cloud computing environment comprising a client device in communication with cloud service providers, in accordance with one or more implementations.

Below are detailed descriptions of various concepts related to, and implementations of, techniques, approaches, methods, apparatuses, and systems for synchronizing client data structures with session events. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful:

Section A describes a network environment and computing environment which may be useful for practicing embodiments described herein;

Section B describes systems and methods for synchronizing client data structures with session events; and Section C describes systems and methods for generating session interfaces based on session events and player profile attributes.

A. Computing and Network Environment

Prior to discussing specific implementations of the various aspects of this technical solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103a-103n and one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include Bluetooth, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., Windows NT, manufactured by Microsoft Corp. of Redmond, Wash.), while one or more of the other servers 106 can operate according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the Hyper-V hypervisors provided by Microsoft; or others. Hosted hypervisors may run within an operating system on a second software level. Examples of hosted hypervisors may include VMware Workstation and VirtualBox.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Referring to FIG. 1B, a cloud computing environment is depicted. A cloud computing environment may provide client 102 with one or more resources provided by a network environment. The cloud computing environment may include one or more clients 102a-102n, in communication with respective agents 103a-103n and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back-end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud-based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers, or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, or web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
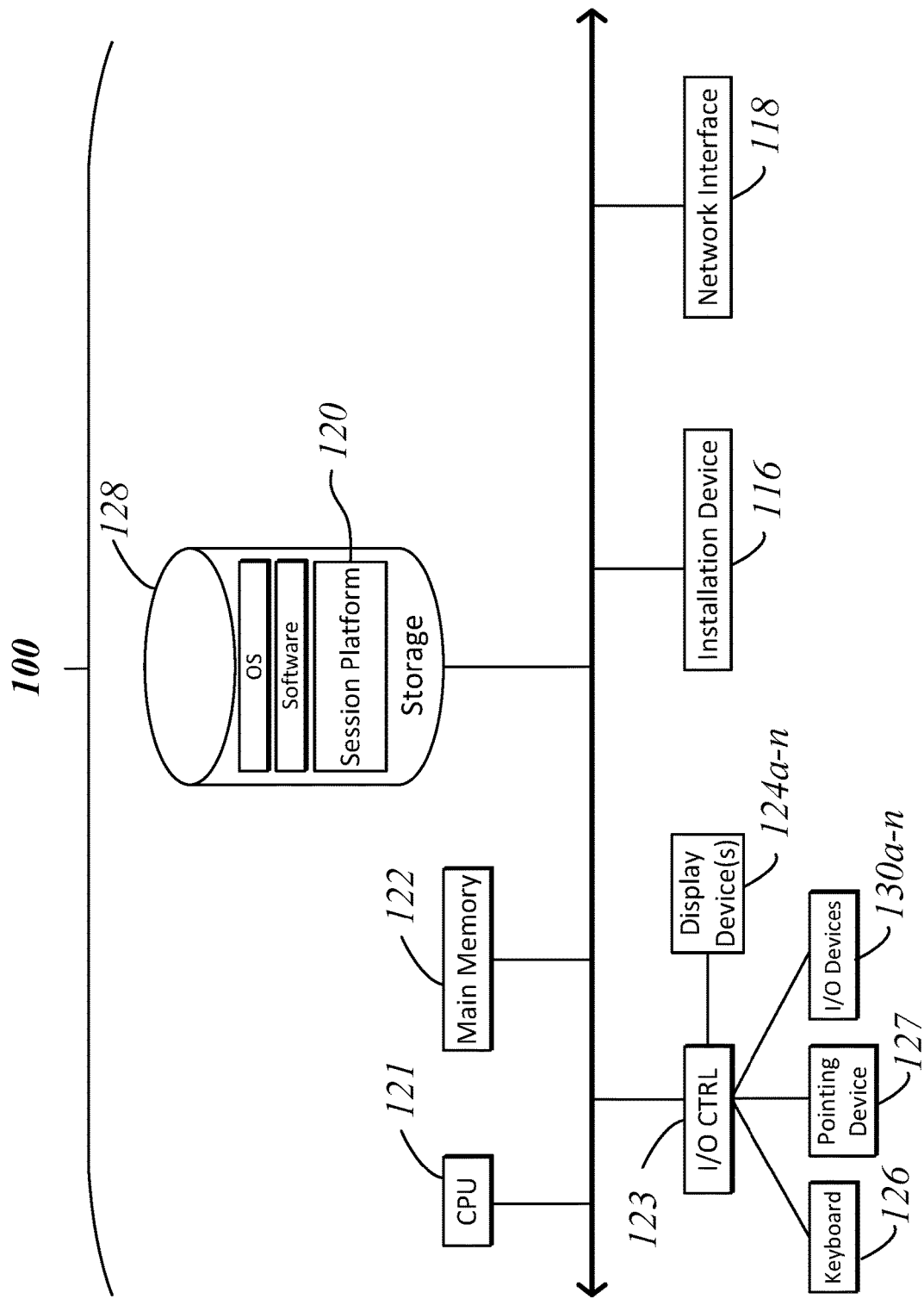
FIGS. 1C and 1D are block diagrams depicting embodiments of computing devices useful in connection with the methods and systems described herein, in accordance with one or more implementations.
Figure 1D:
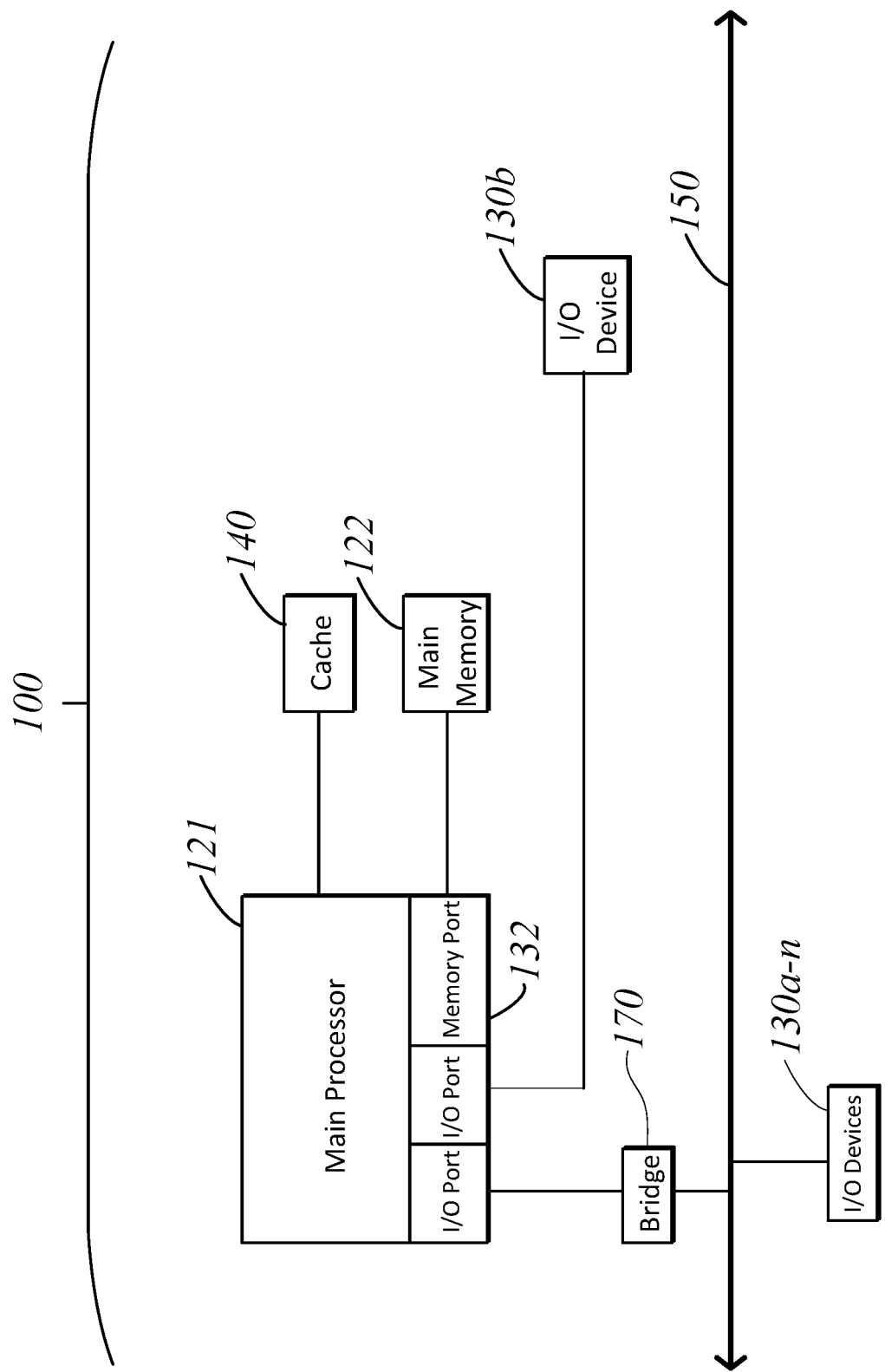

The client 102 and server 106 may be deployed as and/or executed on any type and form of computing device, e.g. a computer, network device, or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126, and a pointing device 127, e.g. a mouse. The storage device 128 may include, without limitation, an operating system, software, and session platform 120, which can implement any of the features of the session processing system 205 described in connection with FIG. 2 and any of the features of the session arrangement system 405 described in connection with FIG. 4. As shown in FIG. 1D, each computing device 100 may also include additional optional elements, e.g. a memory port 132, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction-level parallelism, thread-level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (B SRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 132. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, B SRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch-sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable, or provide for the connection and use of multiple display devices 124a-124n by the computing device 100. For example, the computing device 100 may include any type and/or form of video adapter, video card, driver, and/or library to interface, communicate, connect, or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the session platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase, and/or download an application via the application distribution platform.

Furthermore, the computing device 100 may include a network interface 118 to interface to the network 104 through a variety of connections including, but not limited to, standard telephone lines, LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX, and direct asynchronous connections). In one embodiment, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem, or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution or Ubuntu, distributed by Canonical Ltd. of London, United Kingdom; or Unix or other Unix-like derivative operating systems; and Android, designed by Google of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone, or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, or a NINTENDO SWITCH device manufactured by Nintendo Co., Ltd., of Kyoto, Japan, an XBOX 360, an XBOX ONE, an XBOX ONE S, or an XBOX ONE S device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet, e.g., the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the client device 102 includes a combination of devices, e.g., a smartphone combined with a digital audio player or portable media player. For example, one of these embodiments is a smartphone, e.g., the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the client devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU, and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Synchronizing Client Data Structures with Session Events

In conventional systems, individual remote devices must transmit a request to update their corresponding profiles with corresponding event records, and generate said event records with which to update the profiles, in response to detecting corresponding events that occur in a session. The session processing system described herein solves these and other issues by managing and monitoring events that occur during the session, and automatically generating corresponding records for each remote computing system accessing the session as a viewer automatically, without necessarily requiring user input. Such sessions can be live sessions, in which actions or events performed by a host using an application platform are synchronized across a number of remote computing systems corresponding to profiles of viewers. Records corresponding to the events can be generated in corresponding viewer profiles that include corresponding permissions.

The systems and methods described herein improve upon conventional communication systems by reducing the amount of bandwidth required to synchronize records across large numbers of player profiles. Using the techniques described herein, the session processing system can automatically monitor events that occur during sessions, and generate records in appropriate viewer player profiles without requiring user input. This reduces the overall communication overhead to the system, and therefore operates as an improvement over conventional live session systems.

Additionally, the present techniques can reduce the overall latency to carry out certain time-constrained tasks for players. In conventional systems, a player places a wager using a request, and the system that receives the request will process the wager according to the current odds. The odds, or other characteristics of the wager, may change over time. Therefore, in conventional systems, a player that places a wager at a first time may secure better odds than a player that places a wager at a later time. In contrast, the present techniques improve upon this time by automatically synchronizing wager records for multiple players to an action performed by a single player. This allows for more wagers to be placed with the same odds in a fast moving and dynamic market, thereby allowing for reduced latency and improved throughput for wager interactions. The present techniques operate using unconventional wagering techniques, because they allow for the automatic "mirroring" of wager interactions performed by a host of a session. Rather than accepting wagers individually from players, the present techniques can be used to automatically populate records in a batch for all viewers of a session that have set corresponding permissions. These and other improvements are described in further detail herein below.

Figure 2:
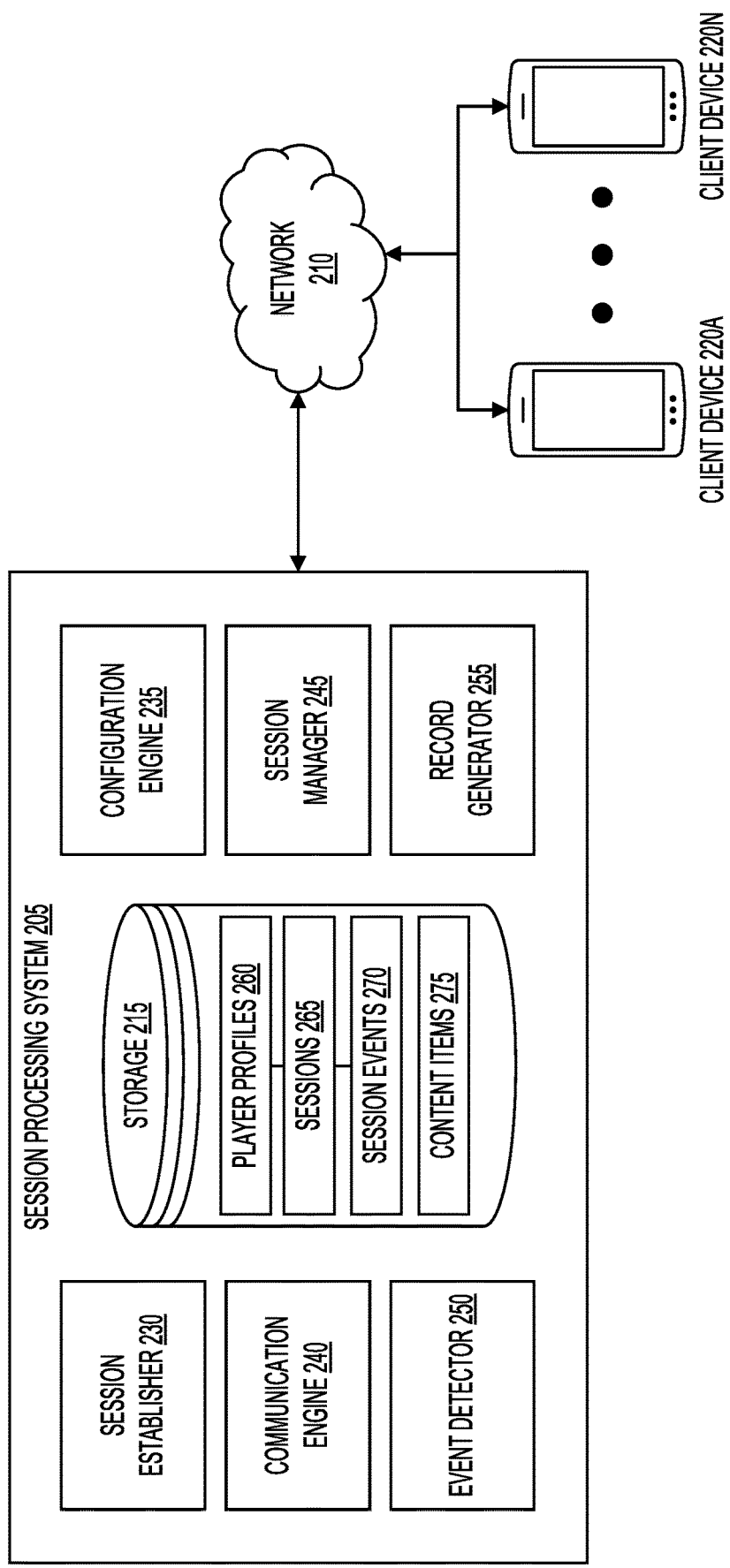
FIG. 2 illustrates a block diagram of an example system for synchronizing client data structures with session events, in accordance with one or more implementations.

Referring now to FIG. 2, illustrated is a block diagram of an example system 200 for synchronizing client data structures with session events, in accordance with one or more implementations. The system 200 can include at least one session processing system 205, at least one network 210, and one or more client devices 220A-220N (sometimes generally referred to as the "client device(s) 220"). The session processing system 205 can include at least one storage 215, at least one session establisher 230, at least one configuration engine 235, at least one communication engine 240, at least one session manager 245, at least one event detector 250, and at least one record generator 255. In some implementations, the storage 215 can be external to the session processing system 205, and may be accessed by the session processing system 205 via one or more computer networks (e.g., the network 210). The storage 215 can store or maintain one or more player profiles 260, one or more sessions 265, one or more session events 270, and one or more content items 275.

Each of the components (e.g., the session processing system 205, the network 210, the storage 215, the client devices 220) of the system 200 can be implemented using the hardware components or a combination of software with the hardware components of a computing system (e.g., computing system 100, etc.) described in connection with FIG. 1. Each of the components of the session processing system 205 (e.g., the session establisher 230, the configuration engine 235, the communication engine 240, the session manager 245, the event detector 250, and the record generator 255) can be implemented in hardware, software, or a combination of hardware and software, and can perform the functionalities detailed herein.

The session processing system 205 can include at least one processor and a memory (e.g., a processing circuit). The memory can store processor-executable instructions that, when executed by the processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The session processing system 205 can include one or more computing devices or servers that can perform various functions as described herein. The session processing system 205 can include any or all of the components and perform any or all of the functions of the computer system 100 described herein in conjunction with FIG. 1.

The network 210 can include computer networks such as the Internet, local, wide, metro or other area networks, intranets, satellite networks, other computer networks such as voice or data mobile phone communication networks, and combinations thereof. The session processing system 205 of the system 200 can communicate via the network 210, for instance with at least one client device 220. The network 210 may be any form of computer network that can relay information between the session processing system 205, the client devices 220, and one or more content sources, such as web servers (not pictured), amongst others. In some implementations, the network 210 may include the Internet and/or other types of data networks, such as a local area network (LAN), a wide area network (WAN), a cellular network, a satellite network, or other types of data networks. The network 210 may also include any number of computing devices (e.g., computers, servers, routers, network switches, etc.) that are configured to receive and/or transmit data within the network 210. The network 210 may further include any number of hardwired and/or wireless connections. Any or all of the computing devices described herein (e.g., the session processing system 205, the client devices 220, the computer system 100, etc.) may communicate wirelessly (e.g., via WiFi, cellular, radio, etc.) with a transceiver that is hardwired (e.g., via a fiber optic cable, a CAT5 cable, etc.) to other computing devices in the network 210. Any or all of the computing devices described herein (e.g., the session processing system 205, the client devices 220, the computer system 100, etc.) may also communicate wirelessly with the computing devices of the network 210 via a proxy device (e.g., a router, network switch, or gateway).

Each of the client devices 220 can include at least one processor and a memory, (e.g., a processing circuit). The memory can store processor-executable instructions that, when executed by processor, cause the processor to perform one or more of the operations described herein. The processor can include a microprocessor, an ASIC, a FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client devices 220 can include one or more computing devices or servers that can perform various functions as described herein. The one or more client devices 220 can include any or all of the components and perform any or all of the functions of the computer system 100 described herein in conjunction with FIGS. 1A-1D. The client devices 220 can be, or can be similar to, the client devices 102 described herein above in conjunction with FIGS. 1A-1D.

Each client device 220 can include, but is not limited to, a mobile device, a laptop, a personal computer, or another type of computing device. Each client device 220 can be implemented using hardware or a combination of software and hardware. Each client device 220 can include a display or display portion. The display can include a display portion of a television, a display portion of a computing device, any type of display device capable of presenting one or more graphical user interfaces (GUIs), or an interactive display device (e.g., a touchscreen, etc.). The client devices 220 can include one or more I/O devices (e.g., a mouse, a keyboard, digital keypad). The display can present GUIs of an application executing on a client device 220, such as the applications used to interact with the session processing system 205, as described herein. The display can include a border region (e.g., side border, top border, bottom border). In some implementations, the display can receive interactions from a player (e.g., a user of the client device, etc.).

The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that couples or communicates with the display of each client device to enable a user to interact with and/or select one or more actionable objects as described herein. The display can enable interaction with one or more interactive user interface elements presented on the display of each client device 220, and responsive to an interaction (e.g., select, click-on, touch, hover), the client device 220 can generate an indication identifying a user input and/or selection of a corresponding user interface element (e.g., a session, a content item 275, etc.).

Each client device 220 can include or be identified by a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some embodiments, each client device 220 can have a unique device identifier. Each client device 220 can include a client application, which can be an application that communicates with the session processing system 205 to update the player profiles 260, to create one or more sessions 265, or to join one or more session 265, as described herein. The application can include a web application, a server application, or a file. In some implementations, the application can include a local application (e.g., local to a client device 220), hosted application, a SaaS application, virtual application, mobile application, and other forms of content. Some example user interfaces that may be provided to a player via the application are shown in FIGS. 6A-6D. In some implementations, the application can include or correspond to applications provided by remote servers or third party servers. In some implementations, the application can access the player profiles 260, the session 265, or the content items 275, stored and maintained at the storage 215. The client application can present one or more actionable objects (e.g., interactive user interface elements) in a user interface of the client application via the display of the client device 220. Such actionable objects can include selectable hyperlinks, buttons, graphics, videos, images, or other application features that generate a signal that is processed by the application executing on the respective client device 220.

In some implementations, one or more client devices 220 can establish one or more communication sessions between the session processing system 205 and the one or more client devices 220. The one or more communication sessions can each include one or more channels or connections between the session processing system 205 and the one or more client devices 220. The one or more communication systems can each include an application session (e.g., virtual application), an execution session, a desktop session, a hosted desktop session, a terminal services session, a browser session, a remote desktop session, a URL session and/or a remote application session. Each communication session can include encrypted and/or secure sessions, which can include an encrypted file, encrypted data or traffic.

Each of the client devices 220 can be computing devices configured to communicate via the network 210 to access information resources, such as web pages via a web browser, or application resources via a native application executing on a client device 220. When accessing information resources, the client device 220 can execute instructions (e.g., embedded in the native applications, in the information resources, etc.) that cause the client devices to display application interfaces. The application interfaces can be, for example, application interfaces that present different types of configuration interfaces for player profiles 260 of the session processing system 205, such an interface to create a player profile 260, an interface to modify a player profile 260, an interface to create a session 265, or an interface to join a viewing session 265, among others.

The application interfaces can, in some implementations, cause the client device 220 to communicate with the session processing system 205. For example, the application can be used to transmit a request to create a player profile 260. The request to create a player profile 260 can include, for example, login credentials, other identifying information, identifiers of the client device 220, identifiers of one or more player attributes to associate with the player profile 260, or any other information related to player profiles 260 as described herein. In some implementations, the application interfaces can include an interface to create a session 265, which may include an interface that specifies multiple other player profiles 260 as invitees to the session 265. The request to create a session 260 can include, for example, an identifier of a live event (e.g., a live sports game broadcast, another type of live event, etc.). The request may include one or more identifiers of other player profiles 260 that are invited to participate in the session 265. In some implementations, the request to create a session 265 can include one or more categories or attributes to associate with the session 265. In some implementations, the request to create a session can include a value corresponding to a number of credits to be wagered by the host during the session 265. Likewise, a request to join a session can include a similar value corresponding to a number of credits to be wagered by the player as a viewer during the session 265.

In some implementations, the application interfaces can generate a notification to join a session 265 in response to receiving a request to join a session 265 received from the session processing system 205. The notification can include an actionable object to accept or reject the invitation to join the session 265. The application interfaces may also display a ranked list of sessions that are currently active, from which the player can select using one or more interactive user interface elements. In response to an interaction with the actionable object indicating the player intends to join the session 265, the application can transmit a message to the session processing system 205 indicating that the player intends to join the identified session 265. The message can include an identifier of the player profile 260 used to access the session processing system 205 via the application executing on the client device 220. In response to an interaction with the actionable object indicating the player does not intend to join the session 265, the application can transmit a message to the session processing system 205 indicating that the player does not intend to join the identified session 265.

As described herein, a client device 220 and the session processing system 205 can exchange messages including information that causes information relating to wagers to be displayed on a display of the client device 220. The session processing system 205 can provide instructions to display wager interfaces at the client device 220. The interfaces can include one or more actionable objects that cause the client device 220 to transmit a request to place a wager on an identified live event. In some implementations, the requests can include an identifier of a player profile 260 used by the client device 220 to access the functionality of the session processing system 205, identifiers of one or more viewing sessions associated with the player profile 260, a wager amount, an identifier of the wager, or other information relevant to a wager. In some implementations, the client device can receive one or more content items 275 for presentation on the display of the client device 220. The wagers transmitted by a player profile 260 identified as a host of a session 265 may be recorded as a corresponding session event 270, in association with the session 265.

The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the session processing system 205, or any other computing device described herein, via the network 210. In some implementations, the storage 215 can be internal to the session processing system 205. In some implementations, the storage 215 can exist external to the session processing system 205, and may be accessed via the network 210. The storage 215 can be distributed across many different computer systems or storage elements, and may be accessed via the network 210 or a suitable computer bus interface.

The session processing system 205 can store, in one or more regions of the memory of the session processing system 205, or in the storage 215, the results of any or all computations, determinations, selections, identifications, generations, or calculations in one or more data structures indexed or identified with appropriate values. Any or all values stored in the storage 215 may be accessed by any computing device described herein, such as the session processing system 205, to perform any of the functionalities or functions described herein. In some implementations, the storage 215 can be similar to or include the storage 128 described herein above in connection with FIG. 1C. In some implementations, instead of being internal to the session processing system 205, the storage 215 can form a part of a cloud computing system. In such implementations, the storage 215 can be a distributed storage medium in a cloud computing system, and can be accessed by any of the components of the session processing system 205 or any other computing devices described herein.

The storage 215 can maintain or store one or more player profiles 260 associated with a player (e.g., a user) of a client device 220 (e.g., a smartphone, laptop, etc.). The player profile 260 can be stored in association with one or more identifiers of one or more client devices 220. The player profile 260 can be a profile that includes information about a player, and information about one or more of the client devices 220 used to access the session processing system 205 using the player profile 260. As described herein, identifiers of a player profile 260 can be used to access the functionality of the session processing system 205. The identifiers can include a username, a password, an e-mail address, a phone number, a personal identification number (PIN), a secret code-word, or device identifiers for use in a two-factor authentication technique, among others. The player profile 260 can store information about, and be associated with, corresponding sessions 265, session events 270, content items 275, accessed broadcast content, associated live events, upcoming live events, fantasy sports lineups (e.g., identifiers of fantasy players, lineups, lineup configurations, fantasy games, and outcomes, etc.) that are performed via the session processing system 205 or computing devices associated with the session processing system 205.

In some implementations, the player profile 260 can store one or more attributes, which may include a credit balance and wager information (e.g., an amount of a wager, a timestamp associated with a wager, information about the presence of an indication to participate in a bonus opportunity using the wager, a client device identifier of a client device 220 that was used to place the wager, etc.), as well as historic records of online activity that the player has performed using the corresponding player profile 260. The player profile 260 can store information about a client device 220 used to access the session processing system 205 such as an Internet Protocol (IP) address, a MAC address, a GUID, an player profile name (e.g., the name of a user of the client device 220, etc.), device name, among others. In some implementations, a player profile 260 can be created by the session processing system 205 in response to a player profile 260 creation request transmitted by a client device 220. The player profile creation request can include any of the player profile information described herein. The player profile 260 can include indications of current or ongoing wagers. For example, the attributes of the player profile 260 can include a list of identifiers of currently open wagers (e.g., the wager is placed, but the outcome is undetermined, etc.). As the outcome of each wager occurs, the player profile 260 can be updated to include the wager outcome. The open wagers may be associated with one or more event parameters, which are described in greater detail in connection with the session events 275.

The attributes of the player profile 260 can include a list or table of previous sessions 265 accessed via the player profile 260 as a viewer, and any session attributes associated with those sessions 265. For example, the list can include a list of identifiers of the previously accessed sessions 265, records of one or more session events 270 (e.g., wagers, player profile 260 modifications, social media actions, etc.) that the player has performed while accessing the session 265 (e.g., including any session events 270 that were performed automatically or that were generated based on session events 270 performed by the host during the corresponding session 265). Similar lists and tables can be maintained for previous sessions 265 in which the player profile 260 was identified as a host, such that each host player profile 260 maintains lists of session events 275 performed during any unexpired (e.g., active) sessions 265, and also lists of session events 270 that have been performed via any historic sessions 265 in which the player profile 260 was identified as host. The historic records of previous sessions 265 may be used to generate recommendations for the player profile 260, for example, when a corresponding request for a list of sessions 265 is requested. In addition, the attributes of the player profile 260 may include a list of historic contests (e.g., wagers) that were previously entered using the player profile 260, including records of any fantasy sports lineups that may have been used in the historic contests. The player profiles 260 may include any other information indicated herein.

The storage 215 can store or maintain one or more sessions 265 associated with one or more player profiles 260, for example, in one or more data structures. As described herein, the session processing system 205 can create one or more sessions 265 in response to receiving a request from a client device 220. A session 265 can be a data structure that identifies a number of player profiles 260 that are participating to the session 265. The session 265 can be, for example, a shared viewing and interaction experience for content, and can include a record of corresponding actions performed by a host player profile 260 of the session. The session 265 can include an identifier of a player profile 260 that is the host of the session (e.g., a "host player profile 260"), as well as a list of one or more player profiles 260 that are viewers of the session (e.g., "viewer player profiles 260"). Each session 265 can be associated with one or more session attributes (sometimes referred to as "attributes of a session"). Some non-limiting examples of session attributes can include session duration, a number of player profiles 260 identified as viewers of the session, an identifier of host player profile 260 of the session 265, a number of session events 270 that have been performed via the session 265, an amount of time before the session 265 will expire, a timestamp corresponding to when the session 265 was established, an identifier of an event type (e.g., a type of sporting event, etc.) associated with the session 265, and any event parameters of any session event 270 performed during the session 265. Each session 265 may be terminated (e.g., no longer updated or monitored by the session processing system 205, as described herein), following a corresponding request from the host of the session 265 or when the corresponding session 265 duration has expired. The session processing system 205 can store lists of historic sessions 265 that have been terminated as part of the sessions 265, with an indication that the session 265 has been terminated. Similarly, the session processing system 205 can store a list of active sessions 265 that are still unexpired, and are monitored by the session processing system 205 as described herein.

Through a session 265, wagers or other session events 270 performed using a host player profile 260 can be displayed as one or more content items 275 at client devices 220 that are accessing the session 265 as a viewer (e.g., using a viewer player profile 260). Players can join or leave sessions 265 by transmitting one or more requests to join or leave the session 265. In some implementations, the session 265 can include a feed of session events 270 that are performed via the host player profile 260. In addition, the feed of session events 270 may include social media features, allowing viewers of the session 265 to comment, like, or otherwise interact with the session events 270 that occur during the session. The session processing system 205 can update the session events 270 indicated in each active session 265 in response to receiving a corresponding request from the host player profile 260 to perform a session event 270, such as a player profile 260 modification or a wager. Information corresponding to a session 265 can be updated by the session processing system 205 in real-time or near real-time, as described herein.

The storage 215 can store or maintain one or more session events 270 associated with each of the one or more sessions 265, for example, in one or more data structures. As described herein, when a host of a session 265 performs an event (such as placing a wager, entering a contest, modifying their player profile 260, perform a social media interaction, etc.) during the session 265, the client device 220 of the host can transmit event data to the session processing system 205 via one or more messages. The messages can include event parameters that indicate various properties of the event, for example, a time of the interaction or event, an amount of a wager (e.g. if the event is a wager), an identifier of a wager type, content of a social media post (e.g., if the event is a social media interaction), instructions to modify a player profile 260 (e.g., including any changes or added information if the event is a player profile 260 modification), information relating to an actionable object (e.g., interactive user interface element) with which the host interacted to carry out the event, identifier(s) of a live event (e.g., a sporting event, another live information happening in real-time, contest, wager opportunity, etc.) associated with the session event 270, identifiers of a type of action (e.g., wager, player profile 260 modification, social media interaction, etc.) performed by the host during the session 265, values corresponding to any input information (e.g., wager amounts, etc.), wager type (e.g., over/under, prop bet, etc.) or any other information relating to an event performed by the host during the session 260. Some example information that may be included in a wager interaction can include, without limitation, any input information as part of the wager (e.g., wager amounts, etc.), the player profile 260 associated with the client device 220 of the host, a wager type (e.g., over/under, prop bet, etc.), an identifier of a live event corresponding to the wager, a wager identifier, a condition of a live event on which the wager was placed, or any other information relating to the wager.

Upon receiving the interaction data of the session event 270, the session processing system 205 can store the interaction data as part of the session events 270, in association with the host player profile 260 that the host player is using to access the functionality of the session processing system 205. The session processing system 205 can also store the session event 270 in association with the corresponding session 265 associated with the host, for example, as part of a feed of session events 270 (e.g., a time series list including timestamps). In some implementations, the session processing system 205 can store the session event data in association with one or more identifiers of live events identified in the event (e.g., sporting events or other live events identified by the event performed by the host, etc.). As described herein, the session events 270 can be stored as a time-series list, or otherwise in association with timestamps, such that the session events 270 for each session 265 can be stored or sorted by timestamp. The time-sorted session events 270 can be provided to each of the client devices 220 associated with a viewer of the corresponding session 265, to be displayed as one or more content items in a feed of content items 275 similar to those shown in FIGS. 6A-6D. Each session event 270 can also be stored in association with one or more data structures that include social media information, such as comments, likes, or records of when a viewer shares or the session event 270 on another webpage or social media platform. The session processing system 205 can update these data structures upon receiving respective interaction data from a client device 220 of a viewer who performs a corresponding interaction with the session event 270. Upon receiving the interaction data, the session processing system 205 can then update one or more content items 275 corresponding to the session event 270 with the social media interaction data, and push the updates to client devices 220 associated with the viewer player profiles 260 of the session 265. This allows the client device 220 of each viewer of the session 265 to show both a feed of up-to-date session events 270, and any social media interactions that occur with the session events 270, in one or more user interfaces such as those shown in FIGS. 6A-6D.

The storage 215 can store or maintain one or more content items 275, for example, in one or more data structures. The content items 275 can be or can include display instructions for the client devices 220, and may be generated by the session processing system 205. In some implementations, the content items 275 can be stored in association with a corresponding player profile 260 associated with a client device 220 to which the content item 275 was transmitted. The content items 275 can include any form of media, such as text, images, video, audio, or instructions to display images, video, or text, with other content items 275 or other information. The content items 275 can be stored in association with one or more tags, topics, or category identifiers that indicate the type of information provided by the content item 275. The content items 275 can each be stored in association with attributes of the content item, including information corresponding to session events 270 performed by the host during a corresponding session 265, or in association with live events corresponding to the content item 275 (e.g., sporting events, teams, score information, athletes participating in a live event, odds information for wagers, or other information relating to live events or wagering, etc.). In some implementations, one or more of the content items 275 can be transmitted to a client device 220 as a notification or alert corresponding to a wager, a session 265, or a session event 270. The content items 275 may be displayed by an application executing on a viewer client device 220 as a feed of content items 275, as shown in FIG. 6C (or in FIG. 6A, where the feed of content items 275 corresponds to a list of ranked sessions 265). In some implementations, the content items 275 may include interactive user interface elements that allow a player to approve performance of an event that corresponds to a session event 265 performed by a host.

The content items 275 can have various presentation attributes. For example, images can include presentation attributes such as image height, image width, image format (e.g., BMP, PNG, JPEG, SVG, etc.), image bit-depth, and other image attributes. Presentation attributes for videos can include video duration, video codec, sound codec, and video resolution (e.g., width, height, etc.), closed captioning information (e.g., text content, etc.), among others. Presentation attributes for text can include font type-face, font size, text location, and other information. For example, a content item 275 can include instructions that cause the item of content item 275 to be presented with a second content item 275 at a client device 220. In some implementations, the presentation attributes of the content item 275 can specify a relative position of the content item 275 when presented in the application executing at the client device 220. In some implementations, the content items 275 can include one or more fantasy sports contests, and can include attributes such as a sport category, a price parameter, a prize parameter, a registrant threshold, a registrant limit, a current registrant count, a day value, a time value, a duration value, a contest type, and an experience level.

The content items 275 can include instructions that allow the content items to include interactive user interface elements (e.g., actionable objects, etc.). The user interface elements can include instructions that cause the client devices 220 displaying the content items 275 (and receiving interactions) to carry out one or more operations. For example, in some implementations, a content item 275 can include instructions that present a user interface element that, when interacted with, causes the client device 220 to provide authorization to automatically carry out events that correspond to session events 270 performed by a host during a session 265. In some implementations, a content item 275 can include instructions that present a user interface element that, when interacted with, causes the client device 220 to modify one or more event parameters corresponding to a session event 270. In some implementations, a content item 275 can include instructions that present a user interface element that, when interacted with, causes the client device 220 to transmit a request to perform an event corresponding to a session event 270 carried out by a host during a session 265. The request can include any of event parameters, including an event type, a time of the interaction or event, an amount of a wager (e.g. if the event is a wager), an identifier of a wager type, content of a social media post (e.g., if the event is a social media interaction), instructions to modify a player profile 260 (e.g., including any changes or added information if the event is a player profile 260 modification), information relating to an actionable object (e.g., interactive user interface element) with which the host interacted to carry out the event, identifier(s) of a live event (e.g., a sporting event, another live information happening in real-time, contest, wager opportunity, etc.) associated with the session event 270, identifiers of a type of action (e.g., wager, player profile 260 modification, social media interaction, etc.) performed by the host during the session 265, values corresponding to any input information (e.g., wager amounts, etc.), wager type (e.g., over/under, prop bet, etc.) or any other information relating to an event performed by the host during the session 260.

Referring now to the operations of the session processing system 205, the session establisher 230 can establish a session 265 in response to a request from a host client device 220 associated with a host player profile 260. The request may identify the host player profile 260 as a host of the session 265. The request can be transmitted by a client device 220, for example, via an application executing on the client device 220. The application can be used to access the functionality of the session processing system 205 using a player profile 260. As described herein, the client device 220 may utilize login credentials or other forms of authentication to access the functionality of the session processing system with the corresponding player profile 260. The application executing on the client device 220 can present one or more interactive user interface elements on a display of the client device 220, such as the user interface elements described in connection with FIGS. 6A-6D. When an interaction is detected with one of the user interface elements (e.g., a "Start Session" user interface element, etc.), the client device 220 can transmit a corresponding request to establish a session 265, with the player profile 260 used by the client device 220 to access the functionality of the session process system 205 as the host of the session 260. The player profile 260 that is identified as the host of the session is referred to herein as the "host player profile 260."

As described herein, a session 265 can include a feed or a record of actions that are performed via the host player profile 260, which may be updated and synchronized in real-time or near real-time with other player profiles 260 that are accessing the session 265 as viewers. Player profiles 260 that access the functionality of the session processing system 205 as a viewer of a session 265 can be referred to herein as "viewer player profiles 260." The request to establish the session 265 can include one or more session attributes, which may include categories associated with the session 265 (e.g., a particular sporting event, a type of sport, a type of events that typically occur during the session, etc.). The session attributes of the session 265 may also include a duration of the session, which indicates the amount of time that the session 265 should be hosted at the session processing system 205. The session duration may be specified in the request to establish the session 265.

To establish the session 265, the session establisher 230 can allocate one or more regions of memory, for example, in the storage 215, for one or more data structures that will include information related to the established session 265. Establishing the session 265 can include assigning a unique identifier to the session 265, and populating one or more data structures of allocated for the session 265 with an identifier of the player profile 260 used to request establishment of the session 265. That player profile 260 can be stored as a host player profile 260. The data structures for the session 265 can be further populated with the attributes of the session provided in the request, such as the session duration or any types categories associated with the session 265, among others. Once the data structures corresponding to the session 265 have been populated, the session 265 can be established by setting a flag associated with the created session 265 to "active," and adding the session 265 to a list of active sessions 265 that are managed by the session processing system 205. As described herein, sessions 265 on the list of active sessions 265 can be monitored, updated, and used to generate notifications and records corresponding to events performed during each session using the respective host player profile 260.

In some implementations, the request to establish the session 265 can include a list of other player profiles 260 to invite as viewers of the session 265. The session establisher 230 can use this list to transmit corresponding notifications to client devices 220 associated with those player profiles 260. The notifications can include, for example, an identifier of the session 265, an identifier of the host player profile 260 associated with the session, and one or more attributes of the session 265 (e.g., associated categories, duration, number of viewers, etc.). The notification may include an interactive user interface element which, when actuated (e.g., selected, interacted with, etc.), causes the application executing on the client device 220 of the invitee to transmit a request to join the session 265.

The configuration engine 235 can configure the host player profile 260 to share records of events (e.g., the session events 270) performed via the host player profile 260 during the session 265. Once the session 265 has been established, the host player profile 260 of the session 265 can be configured to enable monitoring of any events that are performed using the host player profile 260. Configuring the profile can include creating a flag in the host player profile 260 that indicates that events performed using the host player profile 260 during the session 265 can be shared with viewers of the session 265. When monitoring the events of the session 265, the configuration engine 235 can access the flag to determine whether one or more events performed during the session 265 should be shared. For example, if the flag indicates that events should only be shared during a given duration (e.g., the session duration, etc.), the configuration engine 235 can share the events with the viewers, as described herein.

If the host player profile 260 is configured to share records of events performed via the host player profile 260 for the session duration, the configuration engine 235 can share any session events 270 that occur during the session 265, and subsequently reconfigure the host player profile 260 to remove the flag once the session duration has expired. In addition, the session processing system 205 can terminate the session 265 responsive to detecting that the session duration has expired. To determine whether the session duration has expired, the session processing system 205 can compare the current time (e.g., which may be obtained from a network, or an internal clock, or from another source of time), with the time the session 265 will expire (e.g., the time at which the session 265 was established plus the duration of the session 265). If the current time is equal to or greater than the session expiration time, the session duration has expired, and the session 265 can be removed from the list of active sessions 265, and the information associated with the session 265 (e.g., a record of events, viewers, content items 275, interactions, etc.) may be stored in a long-term region of memory (e.g., historical sessions 265), and the host player profile 260 can be reconfigured to stop sharing events. Otherwise, the session 265 can be maintained as an active session 265, and events performed using the host player profile 260 can be shared with player profiles 260 identified as viewers of the session 265.

The communication engine 240 can receive, from one or more viewer client devices 220, one or more requests to join the session 265. Each request may be associated with a respective viewer player profile 260. Each request may be associated with a respective viewer player profile 260. The requests can include an identifier of the session 265 that is to be joined, an identifier of the player profile 260 used to access the communication engine 240 (and thereby transmit the request to join the session 265), and an indication that the join request was transmitted in response to an invitation, if applicable. The request to join the session 265 can be transmitted by an application that corresponds to the session processing system 205 and that executes on a client device 220. The communication engine 240 can transmit lists of active sessions 265 to the application, which may be sorted or ranked in accordance with the techniques described in connection with Section C. The lists of active sessions 265 can be, for example, one or more content items 270 (e.g., the content items 270). An example list of active sessions 265 is described in connection with FIG. 6A.

The request to join a session 265 may be transmitted by a client device 220 in response to an interaction with an active session 265 in the list of active sessions 265 displayed by the application. For example, each active session 265 can include an interactive user interface element, such as a "Join" button. Upon selection of the interactive user interface element, the application executing on the client device 220 can transmit the request to the communication engine 240. Upon receiving the request, the communication engine 240 can add an identifier of the player profile 260 to a list of viewers of the session 265, which may be stored in one or more data structures associated with the session 265. The list can be updated to identify the player profile 260 in the request as a viewer of the session 265. As a viewer of the session 265, the communication engine 240 can transmit one or more content items 275 or feeds of session events 270, or activity that occur in the session 265 to the client devices 220 (e.g., the application executing on the client device 220) for display. This information may be synchronized such that the information appears in real-time or near real-time. As described herein, records corresponding to one or more events performed using the host player profile 260 may be automatically updated in the viewer player profiles 260, according to appropriate permissions. This reduces the overall network traffic and resource consumption at the session

265 computing device, by automatically generating a record without requiring a client device 220 to transmit a request to do so.

The communication engine 240 can receive, from a viewer client device 220, a request to permit automatic population of records corresponding to session events 270 performed via the host player profile 260 during the session 265. As described herein, records corresponding to one or more events performed using the host player profile 260 may be automatically updated in the viewer player profiles 260, according to appropriate permissions. These permissions may be set upon receiving requests transmitted by corresponding client devices 220. For example, an application executing on a client device 220 can include can present a user interface element that allows a player associated with a player profile 260 to configure settings, attributes, or permissions of the player profile 260. One such permission can includes a permission that allows events that are performed during a session 265 using a host player profile 260 to be used to generate corresponding records in the player profile 260. This can allow, for example, wagers that are placed by a host of a session 265 to be automatically placed by a viewer of the session 265, if the appropriate configuration setting is indicated in the viewer player profile 260.

In some implementations, the request to permit automatic population of records can include an indication that corresponding events are to be performed responsive to approval by the player. For example, in some implementations, the population of a record can include populating a data structure that may be used in an event, such as a wager or another session event 270, which can then be approved manually by a player (e.g., by presenting the record at the client device 220 of the player, who may edit or change the record). Once approved by the player (e.g., upon receiving a request to carry out the even with the data structure, which may be manually edited by the player via a user interface), the session processing system 205 can process the data structure to carry out the event. In some implementations, the request to permit automatic population of the records can include an indication that corresponding events are to be performed responsive to automatic populating of the records. In contrast to the manual approval approach, the session processing system 205 may automatically carry out events with the data structures. Carrying out events can include carrying out corresponding action for the player profile 260 using the populated data structure, such as updating profile attributes, characteristics, or properties, placing a wager using with corresponding event parameters, sending messages, notifications, or communications that include information defined in event parameters, or any other event that involves a player profile 260.

The communication engine 240 may also receive a request from a viewer client device 220 to leave a session 265. The request may include an identifier of a session 265 that the player intends leave. Upon receiving the request to leave the session 265, the communication engine 240 can update the viewer player profile 260 to remove the indication to permit automatic population of records corresponding to events performed via the host player profile 260 of the session 265. In addition, the communication engine 240 can remove the identifier of the player profile 260 of the viewer from the list of viewers, and store an indication that the viewer has left the session 265. The indication can include a timestamp and an identifier of the player profile 260 that left the session 265. In some implementations, upon updating the session 265 and the player profile 260, a notification indicating that the player has left the session 265 can be transmitted to the client device 220 from which the request was received.

The event detector 250 can detect a session event 270 performed via the host player profile 260 during the session 260. The session event 270 can include one or more event parameters. The host player profile 260 can perform one or more actions via the application that communicates with the event detector 250. These actions may initiate various events, such as modifications or changes to player profiles 260, placing wagers of various amounts, or sending messages or communications, among other events. The application executing on the client device 220 using the host player profile 260 (sometimes referred to herein as the "host client device 220") is capable of presenting one or more user interfaces, similar to the user interfaces depicted in FIGS. 6A-6D. Such user interfaces may include interactive buttons, hyperlinks, graphics, fields, or other actionable objects that allow the host to perform one or more events during the session 265. These events can include, for example, player profile 260 modifications (e.g., changing settings, adding information to the profile such as tags, categories, or other information, etc.), placing wagers using the host player profile 260 (e.g., wagers on one or more contests or live sporting events, etc.), or sending social media messages (e.g., performing social media actions such as "liking" a post, commenting on a post, sending a message or communication, etc.), among others.

Upon selection of a user interface element corresponding to an event, the application executing on host client device 220 can transmit a request to perform the event to the event detector 250. The request can include a timestamp, and an identifier of the session 265 that the host player profile 260 is hosting. The event detector 250 can detect the event that occurs during the session 265 by determining whether the identified session 265 is active, and if active (and the event is a valid event), the event detector 250 can detect the requested event as occurring during the session 265. An event can be determined to be a valid event if it includes one or more event parameters that satisfy a set of rules (e.g., for wagers a range of valid wager amounts, for profile modifications that one or more modifications do not satisfy one or more modification restriction rules, etc.). In some implementations, the host client device 220 may transmit the request to another server (not shown) to perform the event. In such implementations, the other server may transmit a copy of the request to the event detector 250, or the host client device 220 may also transmit a copy of the request to the event detector 250. The event detector 250 can store an association between the corresponding session event 270, the session 265, the host client device 220, and the host player profile 260 in the memory of event detector 250 or in the storage 215.

The communication engine 240 can transmit a content item 275 identifying the session event 270 for presentation in a user interface of the session 265 at the one or more viewer client devices 220. As described herein, a session 265 can be a live streaming session 265, in which viewers (e.g., players accessing the session processing system 205 of a viewer player profile 260) can receive a feed of session events 270 performed by a host of the session 265 in real-time or near real-time. The viewers can access the session events 270 of the live session 265 via one or more user interfaces, such as the user interfaces described in connection with FIGS. 6A-6D. These user interfaces can include interactive user interface elements, which can allow users to perform social media functionality such as liking a session event 270, commenting on a session event 270, or publishing an identifier of the session event 270 on another social media platform (e.g., with a hyperlink that points to the session event 270, the host player profile 260, or the session event 270).

To populate the user interfaces with session events 270, the session manager 245 can maintain a feed of one or more content items 275 that each corresponds to a respective session event 270 that has been performed by the host during the session 265. In some implementations, each content item 275 can include interactive user interface elements that allow viewers of the session 265 to perform social media functionality such as liking a session event 270, commenting on a session event 270, or sharing an identifier of the session event 270 via one or more other social media platforms or websites. This feed of content items 275 can be transmitted to each client device 220 that is identified as accessing the functionality of the session processing system 205 as a viewer (e.g., using a viewer player profile 260). For example, the communication engine 240 can access the list of viewers of the session 265 when an event occurs, and transmit the feed of content items 275 to each client device 220 associated with each viewer profile in the list of viewers. The feed of one or more content items 275 may include instructions (e.g., including any metadata or event parameters of the session event 270) to display content as a feed at the application executing on the client device 220. In other words, the content items 275 may be display instructions or data structures including information that the client device 220 may display as content on the display.

When a player interacts with one or more of the interactive elements of the content item 275 to perform a social media function, the corresponding client device 220 can transmit a request to the session processing system 205 to perform the corresponding social media function. For example, if a request is a request to comment on an event in a session 265, the communication engine 240 can update one or more data structures that include a timestamped list of comments associated with the corresponding session event 270. Similarly, if the request is a request to like a session event 270, the communication engine 240 can update the corresponding session event 270 by incrementing a counter indicating the number of likes, and store an association between the viewer player profile 260 that liked the event and the event itself. Similar processes can be performed if the request is to share an event. In response to a request to share a session event 270, the communication engine 240 can generate a hyperlink or embedding hyperlink and return the hyperlink to embedding hyperlink to the requesting client device 220, such that it may be shared on other social media platforms, websites, or messages.

When an additional client device 220 (e.g., associated with a corresponding player profile 260) joins the session 265 as a viewer, the communication engine 240 can transmit the feed of content items 275 to the additional client device 220 such that that the player using the client device 220 can view the feed of previous session events 270 that were performed by the host during the session 265. Examples of such an interface are shown in FIG. 6C. Each content item 275 can include a timestamp that identifies when the corresponding session event 270 occurred, and can also include one or more event parameters associated with the session event 270 that the content item 275 represents. Generally, such content items 275 can be sorted in chronological order, however, it should be understood that various interactive user interface elements may enable a player to sort and display the content in any order, including ordered based on any one or more of the event parameters, chronological order, category or type, or any other possible order or ranking.

In addition, if a session event 265 is a conditional event, such as a wager, the event detector 250 can monitor event to detect an outcome or a change in the session event 270, and update one or more of the event parameters associated with the event with the detected outcome or change. The communication engine 240 can update the content items 275 corresponding to the respective events, such that when a changed parameter of an event changes, the content items 275 rendered at each of the viewer client devices 220 change to reflect the updated event parameter (e.g., a change or outcome of the event). For example, if an event is a wager placed on a sports game or a contest, and the wager or contest closes, the event detector 250 can update the event parameters of the event to include the status of the event as closed, with the corresponding outcome for the wager (e.g., win, loss, etc.). In some implementations, if the session event 270 is a time-based event, the content items 275 can be updated to reflect the amount of time left in the event (e.g., a wager opportunity or contest), or the odds or other information related to the event (e.g., event parameters that are updated in real-time or near real-time).

Content items 275 may also be transmitted to client devices 220 associated with player profiles 260 that include an indication to automatically populate records corresponding to session events 270 that occur during the sessions 265. Such content items 275 may be content items 275 that include interactive elements that allow a player to perform the same event using their own player profile 260 (e.g., a profile modification, placing a wager, a social media function, etc.) and the corresponding event parameters of the session event 270 performed by the host during the session 265. An example of one such content item 275 is shown in FIG. 6D, which depicts an example wager that may be placed using the same event parameters as used by the host during the session 265. In some implementations, the content item 275 may include fields or other interactive elements that allow a player to modify the event parameters (e.g., a social media comment text, a wager amount, a modified profile setting), before approving the event to be performed at the session processing system 205. Approval can be performed via an interaction with a corresponding interactive user interface element in the content item, which causes the client device 220 to transmit a request to the session processing system 205 to perform the event (e.g., update the player profile 260, place a wager on an identified event, perform a social media function, etc.).

In some implementations, event parameters of the session event 270 performed by the host player profile 260 during the session 265 may change over time (e.g., changing odds or characteristics of a wager, etc.) To address this, the session processing system 205 can detect changes to one or more event parameters of open events (e.g., events that may have their parameters change, such as wagers) in each active session 265. If the parameters change, the session processing system 205 can transmit a content item 275 or notification to corresponding viewer client devices 220 that are accessing the session 265 to indicate the change in the event parameters. The detected change in the event parameters can be, for example, a change in odds, a change in a potential outcome, an indication that the wager has closed or can no longer be placed, or any other change in an event parameter. In some implementations, the notification can be part of the content item 275 that allows the player to approve performance of the event using similar or modified event parameters, as described herein.

The record generator 255 can generate, in the viewer player profile 260, a record corresponding to the session event 270 responsive to determining that the viewer player profile 260 includes an indication to permit automatic population of records. The record can used to enable performance of a corresponding event via the viewer player profile 260, and can include the one or more event parameters of the corresponding session event 270. As described above, this indication can be an indication that allows for automatic approval of event performance, or manual approval of event performance. If the event indicates that the player must manually approve any event before it is performed, the communication engine 240 can transmit a content item 275 identifying the event and the event parameters in response to detecting that a corresponding event has been using the host player profile 260 during the session 265, as described above. The record may be a data structure that includes event parameters equal or corresponding to the event parameters used in the event performed by the host player profile 260 during the session 265. The record generator 255 can use the record to automatically (or upon manual approval by the player) perform the corresponding event (e.g., placing a wager for the player on the same sports team, with the same wager amount, for the same contest, etc.). The record used to enable performance of a corresponding event can include the event parameters of the event performed using the host player profile 260, or if the event parameters have changed or updated (e.g., odds for a wager or contest has changed, etc.), the updated or changed parameters may be included in the record.

In some implementations, players may set limitations (e.g., constraints) on certain event parameters that may be used to generate such records. These limitations may be set on a per-session basis, or may be default constraints placed for all sessions 265 that the player views. To create such a constraint, the player can transmit a request to modify or set a constraint for a particular event profile (e.g., a total wager amount for a session, an individual wager constraint, a constraint not to place a certain type of wager or enter a certain type of contest, etc.). The communication engine 240 can receive the event parameter limit or constraint, and update the player profile 260 accordingly. When generating a record for the viewer in response to detecting an event performed by the host during the session 265, the record generator 255 can utilize the event parameter limit or constraint specified by the player to generate corresponding event parameters. For example, the host of the session 265 may place wagers from a host-specified amount of credits. Similarly, when requesting to join a session 265, a player may specify an amount of credits that can be wagered through automatic generation of wagers that are proportional those placed by the host. For example, the host may place a wager (e.g., an event) during the session 265 that uses ten percent of the host-specified amount of credits (e.g., which may be used for all wagers during the session 265). Assuming all permissions as described herein are satisfied for the viewer, the record generator 255 can generate and place a corresponding wager (e.g., same or similar event parameters) for a viewer that is ten percent (e.g., a proportionally the same to the host bet) of the player-specified amount of credits for wagers during the session 265. In this way, the player can place a similar distribution of wagers using a customizable amount of credits. To place a wager, the record generator 255 may update one or more bet slips or data structures that indicate the corresponding player profile 260 has placed a wager. The record generator 255 may also deduct the amount of credits placed in the wager from a credit balance associated with the player profile 260.

Figure 3:
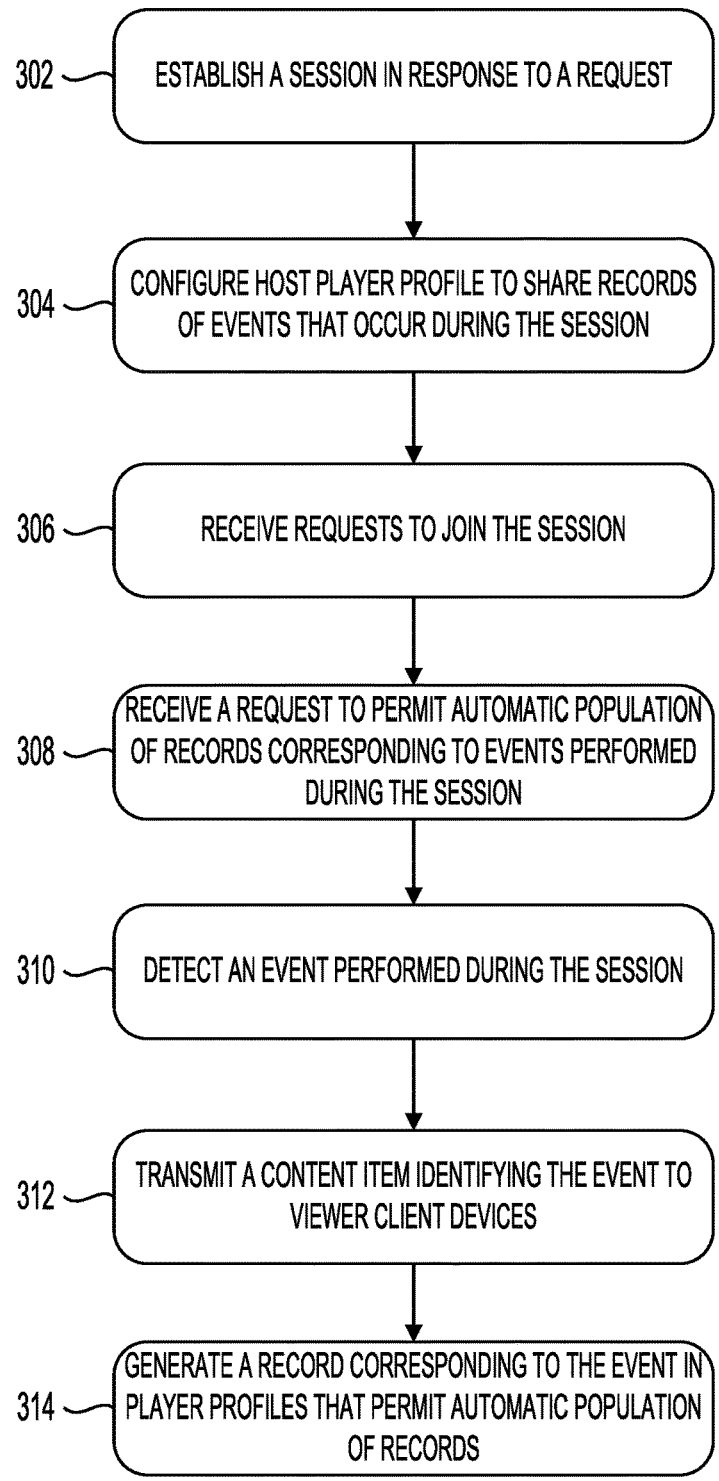
FIG. 3 illustrates an example flow diagram of a method for synchronizing client data structures with session events, in accordance with one or more implementations.

Referring now to FIG. 3, depicted is an illustrative flow diagram of a method 300 for synchronizing client data structures with session events. The method 300 can be executed, performed, or otherwise carried out by the session processing system 205 described in connection with FIG. 2, the session processing system 405 described in connection with FIG. 4, the computer system 100 described in connection with FIGS. 1A-1D, or any other computing devices described herein. The method 300 can include establishing a session in response to a request (STEP 302), configuring a host player profile to share records of events performed during the session (STEP 304), receiving requests to join the session (STEP 306), receiving a request to permit automatic population of records corresponding to events performed during the session (STEP 308), detecting an event performed during the session (STEP 310), transmitting a content item identifying the event to viewer client devices (STEP 312), and generating a record corresponding to the event in player profiles that permit automatic population of records (STEP 314). Although FIG. 3 shows the steps of the method 300 in a particular order, it should be understood that it is contemplated that steps may be combined, omitted, or performed in a different order to achieve desired results.

At step 302, the method 300 can include establishing a session (e.g., a session 265) in response to a request from a host client device (e.g., a client device 220) associated with a host player profile (e.g., a player profile 260). The request may identify the host player profile as a host of the session. The request can be transmitted by a client device, for example, via an application executing on the client device. The application can be used to access the functionality of the session processing system (e.g., the session processing system 205) using a player profile. As described herein, the client device may utilize login credentials or other forms of authentication to access the functionality of the session processing system with the corresponding player profile. The application executing on the client device can present one or more interactive user interface elements on a display of the client device, such as the user interface elements described in connection with FIGS. 6A-6D. When an interaction is detected with one of the user interface elements (e.g., a "Start Session" user interface element, etc.), the client device can transmit a corresponding request to establish a session, with the player profile used by the client device to access the functionality of the session process system as the host of the session. The player profile that is identified as the host of the session is referred to herein as the "host player profile."

As described herein, a session can include a feed or a record of actions (e.g., the session events 270) that are performed via the host player profile, which may be updated and synchronized in real-time or near real-time with other player profiles that are accessing the session as viewers. Player profiles that access the functionality of the session processing system as a viewer of a session can be referred to herein as "viewer player profiles." The request to establish the session can include one or more session attributes, which may include categories associated with the session (e.g., a particular sporting event, a type of sport, a type of events that typically occur during the session, etc.). The session attributes of the session may also include a duration of the session, which indicates the amount of time that the session should be run at the session processing system. The session duration may be specified in the request to establish the session.

To establish the session, the session processing system can allocate one or more regions of memory, for example, in a database (e.g., the storage 215), for one or more data structures that will include information related to the established session (e.g., the sessions 265). Establishing the session can include assigning a unique identifier to the session, and populating one or more data structures of allocated for the session with an identifier of the player profile used to request establishment of the session. That player profile can be stored as a host player profile. The data structures for the session can be further populated with the attributes of the session provided in the request, such as the session duration or any types categories associated with the session, among others. Once the data structures corresponding to the session have been populated, the session can be established by setting a flag associated with the created session to "active," and adding the session to a list of active sessions that are managed by the session processing system. As described herein, sessions on the list of active sessions can be monitored, updated, and used to generate notifications and records corresponding to events performed during each session using the respective host player profile.

In some implementations, the request to establish the session can include a list of other player profiles to invite as viewers of the session. The session processing system can use this list to transmit corresponding notifications to client devices associated with those player profiles. The notifications can include, for example, an identifier of the session, an identifier of the host player profile associated with the session, and one or more attributes of the session (e.g., associated categories, duration, number of viewers, etc.). The notification may include an interactive user interface element which, when actuated (e.g., selected, interacted with, etc.), causes the application executing on the client device of the invitee to transmit a request to join the session.

At step 304, the method 300 can include configuring the host player profile to share records of events performed via the host player profile during the session. Once the session has been established, the host player profile of the session can be configured to enable monitoring by the session processing system of any events that are performed using the host player profile. Configuring the profile can include creating a flag in the host player profile that indicates that events performed using the host player profile during the session can be shared with viewers of the session. When monitoring the events of the session, the session processing system can access the flag to determine whether one or more events performed during the session should be shared. For example, if the flag indicates that events should only be shared during a given duration (e.g., the session duration, etc.), the session processing system can share the events with the viewers, as described herein.

If the host player profile is configured to share records of events performed via the host player profile for the session duration, the session processing system can share any events that occur during the session, and subsequently reconfigure the host player profile to remove the flag once the session duration has expired. In addition, the session processing system can terminate the session responsive to detecting that the session duration has expired. To determine whether the session duration has expired, the session processing system can compare the current time (e.g., which may be obtained from a network, or an internal clock, or from another source of time), with the time the session will expire (e.g., the time at which the session was established plus the duration of the session). If the current time is equal to or greater than the session expiration time, the session duration has expired, and the session can be removed from the list of active sessions, and the information associated with the session (e.g., a record of events, viewers, content items, interactions, etc.) may be stored in a long-term region of memory (e.g., historical sessions), and the host player profile can be reconfigured to stop sharing events. Otherwise, the session can be maintained as an active session, and events performed using the player profile can be shared with player profiles identified as a viewer of the session.

At step 306, the method 300 can include receiving, from one or more client devices (e.g., client devices 220), one or more requests to join a session. Each request may be associated with a respective viewer player profile. The requests can include an identifier of the session that is to be joined, an identifier of the player profile used to access the session processing system (and thereby transmit the request to join the session), and an indication that the join request was transmitted in response to an invitation, if applicable. The request to join the session can be transmitted by an application that corresponds to the session processing system and that executes on a client device. The session processing system can transmit lists of active sessions to the application, which may be sorted or ranked in accordance with the techniques described in connection with Section C. The lists of active sessions can be, for example, one or more content items (e.g., the content items 275). An example list of active sessions is described in connection with FIG. 6A.

The request to join a session may be transmitted by a client device in response to an interaction with an active session in the list of active sessions displayed by the application. For example, each active session can include an interactive user interface element, such as a "Join" button. Upon selection of the interactive user interface element, the application executing on the client device can transmit the request to the session processing system. Upon receiving the request, the session processing system can add an identifier of the player profile to a list of viewers of the session, which may be stored in one or more data structures associated with the session. The list can be updated to identify the player profile in the request as a viewer of the session. As a viewer of the session, the session processing system can transmit one or more content items or feeds of events or activity that occur in the session to the client device (e.g., the application executing on the client device) for display. This information may be synchronized such that the information appears in real-time or near real-time. As described herein, records corresponding to one or more events performed using the host player profile may be automatically updated in the viewer player profiles, according to appropriate permissions. This reduces the overall network traffic and resource consumption at the session processing system, by automatically generating a record without requiring a client device to transmit a request to do so.

At step 308, the method 300 can include receiving, from a viewer client device of the plurality of viewer client devices, a request to permit automatic population of records corresponding to events performed via the host player profile during the session. As described herein, records corresponding to one or more events performed using the host player profile may be automatically updated in the viewer player profiles, according to appropriate permissions. These permissions may be set upon receiving requests transmitted by corresponding client devices 220. For example, an application executing on a client device can include presenting a user interface element that allows a player associated with a player profile to configure settings, attributes, or permissions of the player profile. One such permission can include a permission that allows events that are performed during a session using a host player profile to generate corresponding records in the player profile. This can allow, for example, wagers that are placed by a host of a session to be automatically placed by a viewer of the session, if the appropriate configuration setting is indicated in the viewer player profile.

In some implementations, the request to permit automatic population of records can include an indication that corresponding events are to be performed responsive to approval by the player. For example, in some implementations, the population of a record can include populating a data structure that may be used in an event, such as a wager, which can then be approved manually by a player (e.g., by presenting the record at the client device of the player, who may edit or change the record). Once approved by the player (e.g., upon receiving a request to carry out the even with the data structure, which may be manually edited by the player via a user interface), the session processing system can process the data structure to carry out the event. In some implementations, the request to permit automatic population of the records can include an indication that corresponding events are to be performed responsive to automatic populating of the records. In contrast to the manual approval approach, the session processing system may automatically carry out events with the data structures. Carrying out events can include carrying out corresponding action for the player profile using the populated data structure, such as updating profile attributes, characteristics, or properties, placing a wager using with corresponding event parameters, sending messages, notifications, or communications that include information defined in event parameters, or any other event that involves a player profile.

The session processing system may also receive a request from a viewer client device to leave a session. The request may include an identifier of a session that the player intends leave. Upon receiving the request to leave the session, the session processing system can update the viewer player profile to remove the indication to permit automatic population of records corresponding to events performed via the host player profile of the session. In addition, the session processing system can remove the identifier of the player profile of the viewer from the list of viewers, and store an indication that the viewer has left the session. The indication can include a timestamp and an identifier of the player profile that left the session. In some implementations, upon updating the session and the player profile, a notification indicating that the player has left the session can be transmitted to the client device from which the request was received.

At step 310, the method 300 can include detecting an event performed via the host player profile during the session. The event may identify one or more event parameters. The host player profile can perform one or more actions via the application that communicates with the session processing system. These actions may initiate various events, such as modifications or changes to player profiles, placing wagers of various amounts, or sending messages or communications, among other events. The application executing on the client device using the host player profile (sometimes referred to herein as the "host client device") is capable of presenting one or more user interfaces, similar to the user interfaces depicted in FIGS. 6A-6D. Such user interfaces may include interactive buttons, hyperlinks, graphics, fields, or other actionable objects that allow the host to perform one or more events during the session. These events can include, for example, player profile modifications (e.g., changing settings, adding information to the profile such as tags, categories, or other information, etc.), placing wagers using the host player profile (e.g., wagers on one or more contests or live sporting events, etc.), or sending social media messages (e.g., performing social media actions such as "liking" a post, commenting on a post, sending a message or communication, etc.), among others.

Upon selection of a user interface element corresponding to an event, the application executing on host client device can transmit a request to perform the event to the session processing system. The request can include a timestamp, and an identifier of the session that the host player profile is hosting. The session processing system can detect the event that occurs during the session by determining whether the identified session is active, and if active (and the event is a valid event), the session processing system can detect the requested event as occurring during the session. An event can be determined to be a valid event if it includes one or more event parameters that satisfy a set of rules (e.g., for wagers a range of valid wager amounts, for profile modifications that one or more modifications do not satisfy one or more modification restriction rules, etc.). In some implementations, the host client device may transmit the request to another server (not shown) to perform the event. In such implementations, the other server may transmit a copy of the request to the session processing system, or the host client device may also transmit a copy of the request to the session processing system. The session processing system can store an association between the corresponding session event, the session, the host client device, and the host player profile in the memory of session processing system or in the database.

At step 312, the method 300 can include transmitting a content item identifying the event for presentation in a user interface of the session at the plurality of viewer client devices. As described herein, a session can be a live streaming session, in which viewers (e.g., players accessing the session processing system of a viewer player profile) can receive a feed of events performed by a host of the session in real-time or near real-time. The viewers can access the events in the live session via one or more user interfaces, such as the user interfaces described in connection with FIG. 6. These user interfaces can include interactive user interface elements, which can allow users to perform social media functionality such as liking an event, commenting on an event, or publishing an identifier of the event on another social media platform (e.g., with a hyperlink that points to the event, the host player profile, or the session).

To populate the user interfaces with events, the session processing system can maintain a feed of one or more content items that each corresponds to a respective event that has been performed by the host during the session. In some implementations, each content item can include interactive user interface elements that allow viewers of the session to perform social media functionality such as liking an event, commenting on an event, or sharing an identifier of the event via one or more other social media platforms or websites. This feed of content items can be transmitted to each client device that is identified as accessing the functionality of the session processing system as a viewer (e.g., using a viewer player profile). For example, the session processing system can access the list of viewers of the session when an event occurs, and transmit the feed of content items to each client device associated with each viewer profile in the list of viewers. The feed of one or more content items may be instructions (e.g., including any metadata or event parameters of the event) to display content as a feed at the application executing on the client device. In other words, the content items may be display instructions or data structures including information that the client device may display as content on the display.

When a player interacts with one or more of the interactive elements of the content item to perform a social media function, the corresponding client device can transmit a request to the session processing system to perform the corresponding social media function. For example, if a request is a request to comment on an event in a session, the session processing system can update one or more data structures that include a timestamped list of comments associated with the corresponding session event. Similarly, if the request is a request to like a session event, the session processing system can update the corresponding session event by incrementing a counter indicating the number of likes, and store an association between the viewer player profile that liked the event and the event itself. Similar processes can be performed if the request is to share an event. In response to a request to share an event, the session processing system can generate a hyperlink or embedding hyperlink and return the hyperlink to embedding hyperlink to the requesting client device, such that it may be shared on other social media platforms, websites, or messages.

When an additional client device (e.g., associated with a corresponding player profile) joins the session as a viewer, the session processing device can transmit the feed of content items to the additional client device such that that the player using the client device can view the feed of previous events that were performed by the host during the session. Examples of such an interface are shown in FIG. 6C. Each content item can include a timestamp that identifies when the corresponding event occurred, and can also include one or more event parameters associated with the event that the content item represents. Generally, such content items can be sorted in chronological order, however, it should be understood that various interactive user interface elements may enable a player to sort and display the content in any order, including ordered based on any one or more of the event parameters, chronological order, category or type, or any other possible order or ranking.

In addition, if an event is a conditional event, such as a wager, the session processing system can monitor event to detect an outcome or a change in the event, and update one or more of the event parameters associated with the event with the detected outcome or change. The session processing system can update the content items corresponding to the respective events, such that when a changed parameter of an event changes, the content items rendered at each of the viewer client devices change to reflect the updated event parameter (e.g., a change or outcome of the event). For example, if an event is a wager placed on a sports game or a contest, and the wager or contest closes, the session processing system can update the event parameters of the event to include the status of the event as closed, with the corresponding outcome for the wager (e.g., win, loss, etc.). In some implementations, if the event is a time-based event, the content items can be updated to reflect the amount of time left in the event (e.g., a wager opportunity or contest), or the odds or other information related to the event (e.g., event parameters that are updated in real-time or near real-time).

Content items may also be transmitted to client devices associated with player profiles that include an indication to automatically populate records corresponding to events that occur during the sessions. Such content items may be content items that include interactive elements that allow a player to perform the same event using their own profile (e.g., a profile modification, placing a wager, a social media function, etc.) and the corresponding event parameters of the event performed by the host during the session. An example of one such content item is shown in FIG. 6D, which depicts an example wager that may be placed using the same event parameters as used by the host during the session. In some implementations, the content item may include fields or other interactive elements that allow a player to modify the event parameters (e.g., a social media comment text, a wager amount, a modified profile setting), before approving the event to be performed at the session processing system. Approval can be performed via an interaction with a corresponding interactive user interface element in the content item, which causes the client device to transmit a request to the session processing system to perform the event (e.g., update the player profile, place a wager on an identified event, perform a social media function, etc.).

In some implementations, event parameters of the event performed by the host player profile during the session may change over time (e.g., changing odds or characteristics of a wager, etc.) To address this, the session processing system can detect changes to one or more event parameters of open events (e.g., events that may have their parameters change, such as wagers) in each active session. If the parameters change, the session processing system can transmit a content item or notification to corresponding viewer client devices that are accessing the session to indicate the change in the event parameters. The detected change in the event parameters can be, for example, a change in odds, a change in a potential outcome, an indication that the wager has closed or can no longer be placed, or any other change in an event parameter. In some implementations, the notification can be part of the content item that allows the player to approve performance of the event using similar or modified event parameters, as described herein.

At step 314, the method 300 can include generating, in the viewer player profile, a record corresponding to the event responsive to determining that the viewer player profile includes an indication to permit automatic population of records. As described above, this indication can be an indication that allows for automatic approval of event performance, or manual approval of event performance. If the event indicates that the player must manually approve any event before it is performed, the session processing system can transmit a content item identifying the event and the event parameters in response to detecting that a corresponding event has been using the host player profile during the session, as described above. The record may be a data structure that includes event parameters equal or corresponding to the event parameters used in the event performed by the host player profile during the session. The session processing system can use the record to automatically (or upon manual approval by the player) perform the corresponding event (e.g., placing a wager for the player on the same sports team, with the same wager amount, for the same contest, etc.). The record used to enable performance of a corresponding event can include the event parameters of the event performed using the host player profile, or if the event parameters have changed or updated (e.g., odds for a wager or contest has changed, etc.), the updated or changed parameters may be included in the record.

In some implementations, players may set limitations (e.g., constraints) on certain event parameters that may be used to generate such records. These limitations may be set on a per-session basis, or may be default constraints placed for all sessions that the player views. To create such a constraint, the player can transmit a request to modify or set a constraint for a particular event profile (e.g., a total wager amount for a session, an individual wager constraint, a constraint not to place a certain type of wager or enter a certain type of contest, etc.). The session processing system can receive the event parameter limit or constraint, and update the player profile accordingly. When generating a record for the viewer in response to detecting an event performed by the host during the session, the session processing system can utilize the event parameter limit or constraint specified by the player to generate corresponding event parameters. For example, the host of the session may place wagers from a host-specified amount of credits. Similarly, when requesting to join a session, a player may specify an amount of credits that can be wagered through automatic generation of wagers that are proportional those placed by the host. For example, the host may place a wager (e.g., an event) during the session that uses ten percent of the host-specified amount of credits (e.g., which may be used for all wagers during the session). Assuming all permissions as described herein are satisfied for the viewer, the session processing system can generate and place a corresponding wager (e.g., same or similar event parameters) for a viewer that is ten percent (e.g., a proportionally the same to the host bet) of the player-specified amount of credits for wagers during the session. In this way, the player can place a similar distribution of wagers using a customizable amount of credits. To place a wager, the session processing system may update one or more bet slips or data structures that indicate the corresponding player profile has placed a wager. The session processing system may also deduct the amount of credits placed in the wager from a credit balance associated with the player profile.

C. Generating Session Interfaces Based on Session Events and Player Profile Attributes Conventional content management systems allocate and utilize a large amount of computing resources to transmit content to a very large number of remote computing devices. Similarly, remote computing devices also allocate and use a lot of computing resources to receive and display the content received from the systems that are responsible for managing and delivering user interfaces. In the case of mobile devices where memory, processing power and power are all finite resources, the receipt and display of content that is not contextually relevant to a user can adversely affect the device's performance and life as well the overall user experience. This is particularly true with large amounts of live session content that are updated and provided in real-time, based on real-time changes in external events and actions performed during live sessions.

The systems and methods of this technical solution solve these and other issues by generating session interfaces, which may be personalized to particular player profiles, based on session events and player profile attributes. As such, the systems and methods of the present solution are directed to generating user interfaces that improve computer resource allocation. The systems and methods described herein conserve and better allocate computer resources by generating interfaces that include sets of sessions. Such sessions can be live sessions, in which actions or events performed by a host using an application platform are synchronized across a number of remote computing systems corresponding to profiles of viewers. Interfaces, which may include up-to-date and relevant information, corresponding to the events can be generated for viewer profiles. These interfaces can be generated to provide relevant session information in a near real-time format, such that computational resources are not wasted on providing irrelevant, or potentially inactive, live session events. The systems and methods described herein therefore improve the overall computational performance of live session systems, while enhancing the overall user experience.

Figure 4:
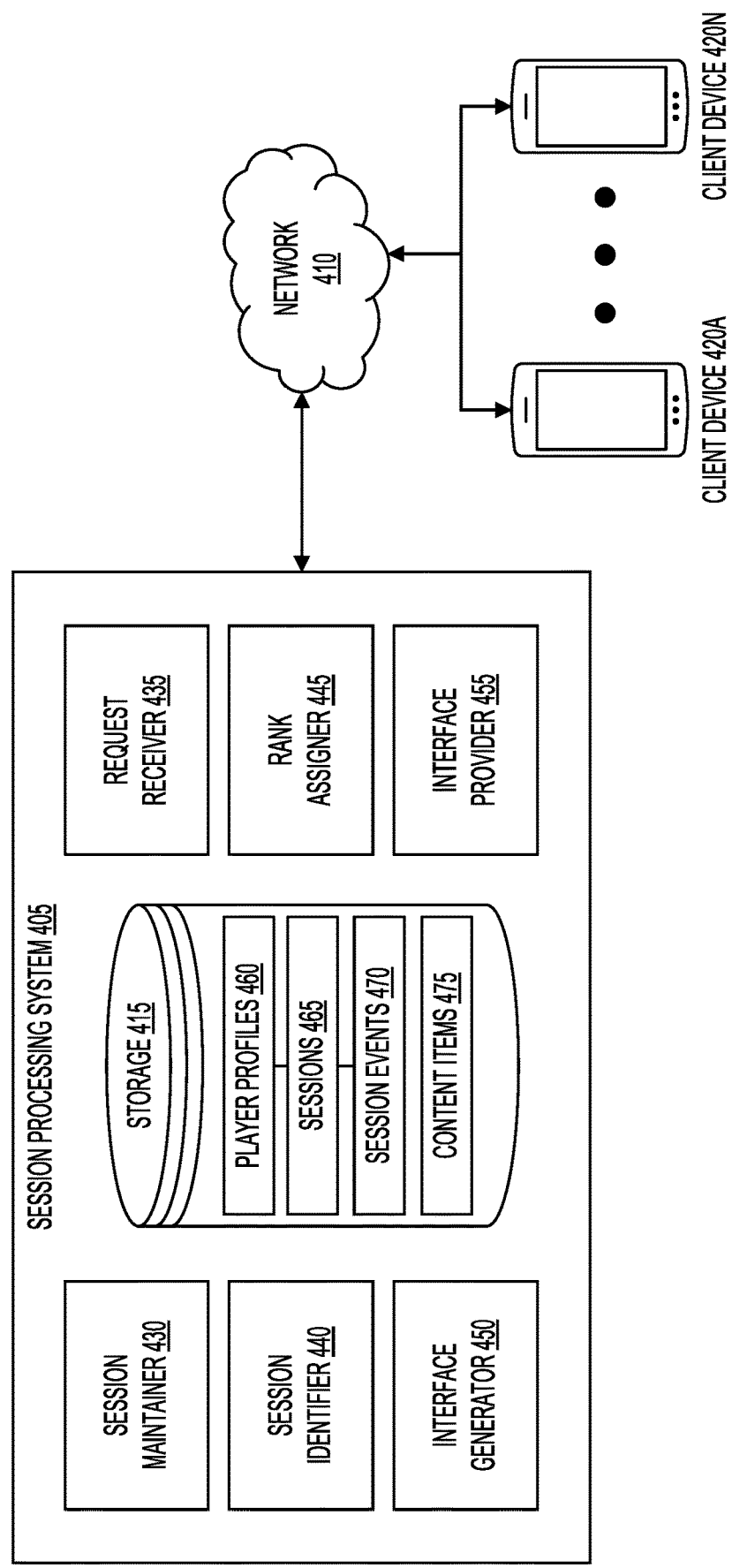
FIG. 4 illustrates a block diagram of an example system for generating session interfaces based on session events and player profile attributes, in accordance with one or more implementations.

Referring now to FIG. 4, illustrated is a block diagram of an example system 400 for generating session interfaces based on session events and player profile attributes, in accordance with one or more implementations. The system 400 can include at least one session processing system 405, at least one network 410, and one or more client devices 420A-420N (sometimes generally referred to as the "client device(s) 420"). The session processing system 405 can include at least one storage 415, at least one session maintainer 430, at least one request receiver 435, at least one session identifier 440, at least one rank assigner 445, at least one interface generator 450, and at least one interface provider 455. In some implementations, the storage 415 can be external to the session processing system 405, and may be accessed by the session processing system 405 via one or more computer networks (e.g., the network 410). The storage 415 can store or maintain one or more player profiles 460, one or more sessions 465, one or more session events 470, and one or more content items 475.

Each of the components (e.g., the session processing system 405, the network 410, the storage 415, the client devices 420) of the system 400 can be implemented using the hardware components or a combination of software with the hardware components of a computing system (e.g., computing system 100, etc.) described in connection with FIG. 1. Each of the components of the session processing system 405 (e.g., the session maintainer 430, the request receiver 435, the session identifier 440, the rank assigner 445, the interface generator 450, and the interface provider 455) can be implemented in hardware, software, or a combination of hardware and software, and can perform the functionalities detailed herein.

The session processing system 405 can include all of the structure of, and can perform any of the functionality of, the session processing system 205 described in connection with FIG. 2. Similarly, each of the network 410 and the client devices 420 can include all of the structure of, and can perform any of the functionality of, the network 210 and the client devices 220, respectively, described in connection with FIG. 2. Likewise, the storage 415, and the player profiles 460, the session 465, the session events 470, and the content items 475 can be similar to, include all of the structure of, and perform any of the functionality of, the storage 215, and the player profiles 260, the session 265, the session events 270, and the content items 275, respectively, described in connection with FIG. 2.

It should be understood that while operations that are different from those described in connection with FIG. 2 are described in connection with FIG. 4, that any of the computing devices of FIG. 4 can perform any of the functionality of the computing devices described in connection with FIG. 2, and vice versa. It will be appreciated that any of the components of the session processing system 405 may be present in the session processing system 205 of FIG. 2, and vice versa.

Referring now to the operations of the session processing system 405, the session maintainer 430 can maintain one or more active sessions 465. Each active session 465 can identify a respective host player profile 460. Each of the one or more active sessions 465 may be associated with one or more session attributes. The one or more session attributes of the one or more active sessions 465 may include an identifier of an event type. The session maintainer 430 can store, and update, a list of active sessions 465. Active sessions 465 are sessions 465 that have been established and have not yet been terminated, and are actively monitored and updated by the session processing system 405, as described in connection with Section B. Each of the active sessions 465 can be stored in association with one or more session events (e.g., the session events 470) that are performed via the host player profile during the respective session 465. The session maintainer 430 can establish one or more sessions 465 in response to a request from a client device (e.g., a client device 420).

The request may identify the host player profile 460 as a host of the session. The request can be transmitted by a client device 420, for example, via an application executing on the client device 420. The application can be used to access the functionality of the session maintainer 430 using a player profile 460. As described herein, the client device 420 may utilize login credentials or other forms of authentication to access the functionality of the session maintainer 430 with the corresponding player profile 460. The application executing on the client device 420 can present one or more interactive user interface elements on a display of the client device 420, such as the user interface elements described in connection with FIGS. 6A-6D. When an interaction is detected with one of the user interface elements (e.g., a "Start Session" user interface element, etc.), the client device 420 can transmit a corresponding request to establish a session 465, with the player profile 460 used by the client device 420 to access the functionality of the session processing system 405 as the host of the session. The player profile 460 that is identified as the host of the session is referred to herein as the "host player profile."

As described herein, a session 465 can be a feed or a record of actions that are performed via the host player profile 460, which may be updated and synchronized in real-time or near real-time with other player profiles 460 that are accessing the session 465 as viewers. Player profiles 460 that access the functionality of the session maintainer 430 as a viewer of a session 465 can be referred to herein as "viewer player profiles." The request to establish the session 465 can include one or more session attributes, which may include categories associated with the session 465 (e.g., a particular sporting event, a type of sport, a type of events that typically occur during the session 465, etc.). The session attributes of the session 465 may also include a duration of the session 465, which indicates the amount of time that the session 465 should be run at the session maintainer 430. The session duration may be specified in the request to establish the session 465.

To establish the session 465, the session maintainer 430 can allocate one or more regions of memory, for example, in a database (e.g., the storage 415), for one or more data structures that will include information related to the established session (e.g., the sessions 465). Establishing the session 465 can include assigning a unique identifier to the session 465, and populating one or more data structures of allocated for the session 465 with an identifier of the player profile 460 used to request establishment of the session 465. That player profile 460 can be stored as a host player profile 460. The data structures for the session 465 can be further populated with the attributes of the session 465 provided in the request, such as the session duration or any types categories associated with the session 465, among others.

Once the data structures corresponding to the session 465 have been populated, the session 465 can be established by setting a flag associated with the created session 465 to "active," and updating a list of active sessions 465 that are managed by the session maintainer 430 to include the established session 465. As described herein, sessions 465 on the list of active sessions 465 can be monitored, updated, and used to generate notifications and records corresponding to events performed during each session 465 using the respective host player profile 460. In addition, lists of active sessions 465 may be displayed to potential viewers of the session 465 in response to one or more requests.

The request receiver 435 can receive, from a client device 420 associated with a player profile 460, a request for a list of active sessions 465. The request can identify the player profile 460 associated with the client device 420 (sometimes referred to as the "requesting player profile"). In some implementations, the request can include a request for a predetermined number of active sessions 465 (e.g., ten active sessions 465, twenty active sessions 465, etc.). The request for the list of active sessions 465 can be transmitted by an application associated with the request receiver 435, and that executes on the client device 420. In response to the request, the request receiver 435 can perform further steps of the method 500 to identify, rank, and transmit a list of active sessions 465 to the application. The lists of active sessions 465 can be or may include, for example, one or more content items (e.g., the content items 475). An example list of active sessions 465 is described in connection with FIG. 6A. The request may identify a group of host player profiles 460 for use in generating the list of active sessions 465. For example, the request may indicate that the request receiver 435 should return active sessions 465 identifying host player profiles 460 that the player follows (e.g., as indicated in the player profile 460 associated with the request).

The request for the list of active sessions 465 may be transmitted by a client device 420 in response to an interaction with a corresponding interactive user interface element displayed by the application. For example, a user interface of the application may include a "Social" button, or another button (e.g., "All Users," "Following," etc.) which specify a group of host player profiles 460 to access when identifying the list of active session 465. Upon selection of the interactive user interface element, the application executing on the client device can transmit the request to the request receiver 435. Upon receiving the request, the request receiver 435 can reduce the list of all active sessions 465 monitored by the request receiver 435 to a smaller subset using the techniques described herein. This reduces the overall network traffic and resource consumption at the request receiver 435, by automatically generating a record without requiring a client device 420 to transmit a request to do so.

The session identifier 440 can identify a subset of the one or more active sessions 465 based on the one or more session attributes of each of the one or more active sessions 465. As described herein, the session maintainer 430 can maintain a list of active sessions 465, which may each be associated with a respective set of session attributes. Some non-limiting examples of session attributes can include session duration, a number of player profiles 460 identified as viewers of the session 465, an identifier of host player profile 460 of the session 465, a number of session events 470 that have been performed via the session 465, an amount of time before the session 465 will expire, a timestamp corresponding to when the session 465 was established, an identifier of an event type associated with the session 465, a category identifier associated with the session 465 and any event parameters of any session event 470 performed during the session.

To reduce the number of the active sessions 465 that are required to be provided to the user, the session identifier 440 can filter the one or more active sessions 465 according to various criteria (e.g., filtering rules). The filtering rules can be applied to any of the attributes of the active session 465. The subset of the active sessions 465 may be identified based on the amount of time remaining in the session 465 (e.g., the amount of time left). For example, the session identifier 440 may identify the subset as comprising active sessions 465 that have at least a predetermined amount of time until the session 465 expires. In this way, sessions 465 that are about to expire may not be provided to a player when the player requests a list of active sessions 465 via the client device. Similarly, the request for active sessions 465 may itself include one or more criteria. For example, the request for the list of active sessions 465 may specify one or more desired attributes for the session 465, such as event type, category, topic, duration, number of viewers, or number of session events 470, among others. The session identifier 440 can compare the provided criteria to the attributes of each active session 465, and identify the subset as the active sessions 465 that satisfy the specified criteria. In some implementations, the session identifier 440 may utilize a predetermined or default criteria for identifying the subset of the sessions 465. In some implementations, the request may include a string of characters as a search query, which the session identifier 440 can use to filter to active sessions 465 identifying a host player profile 460 name that matches the search query. For example, the session identifier 440 can utilize one or more string matching algorithms to filter the one or more active sessions 465 to the subset, such as fuzzy string matching.

In some implementations, the session identifier 440 can identify the subset in part based on the attributes of the player profile 460 associated with the client device 420 that transmitted the request. As described herein, the player profile 420 attributes may include, for example, a credit balance and wager information associated with the player profile 420 (e.g., an amount of each wager, a timestamp associated with each wager, information about the presence of an indication to participate in a bonus opportunity using the wager, a client device identifier of a client device 420 that was used to place the wager, etc.), as well as historic records of online activity (e.g., the session events 470) that the player has performed using the corresponding player profile 460 (and any event parameters associated therewith). The attributes of the player profile 460 can include a list or table of previous sessions 465 accessed via the player profile 460 as a viewer, and any session attributes associated with those sessions 465. For example, the list can include a list of identifiers of the previously accessed sessions 465, records of one or more session events 470 (e.g., wagers, player profile 460 modifications, social media actions, etc.) that the player has performed while accessing the session 465 (e.g., including any session events 470 that were performed automatically or that were generated based on session events 470 performed by the host during the corresponding session 465) as a viewer. Additionally, the session identifier 440 can access the session events 470 performed by player profiles 460 that are similar to a host player profile 460 (e.g., have a predetermined number of player attributes in common, etc.), and identify sessions 465 hosted by those player profiles 460 as part of the subset.

The session identifier 440 can identify the subset of the one or more active sessions 465 further based on the one or more player attributes of the player profile 460. For example, can access the list of historic sessions accessed using the player profile 460 to determine frequency distributions of the attributes of historic sessions that have been recently (e.g., based on the timestamp of the historic session) been accessed using the player profile 460. These frequency distributions can indicate the frequency of attributes of sessions 465 that the player has previously accessed. The session identifier 440 can identify active sessions 465 for inclusion in the subset that include attributes that match attributes of historic sessions accessed using the player profile. In some implementations, the session identifier 440 can identify active sessions 465 for the subset that include attributes that match the most frequent (e.g., a frequency that is greater than a predetermined threshold, a top number of most frequent attributes, etc.) attributes of sessions 465 previously accessed using the player profile 460.

In some implementations, the player profiles 460 may indicate associations with other player profiles 460. For example, by transmitting corresponding requests via the user interfaces provided by the client application, the player can create an association between their player profile 460 and another specified player profile 460. The associations can be one-way associations (e.g., a follow association) to two-way associations (e.g., a social media friend association). In some implementations, the session identifier 440 can identify the subset of the one or more active sessions 465 based on these associations indicated in the player profile 460. For example, the request for the list of active sessions 465 can include an indication that the subset should include active sessions 465 that are hosted using player profiles 460 that the requesting player profile 460 has followed. To accommodate this request, the session identifier 440 can identify the subset of the active sessions 465 as the active sessions 465 that are hosted using player profiles 460 that are indicated as "followed" by the requesting player profile 460. Similar processes can be performed to identify active sessions 465 hosted by "friends" (e.g., a friend association indicated in the player profiles 460) of the requesting player profile 460.

The rank assigner 445 can rank the subset of the one or more active sessions 465 based on a historic record of session events 470 performed via the respective host player profile 460 of each active session 465 of the subset. The historic record of session events 470 may include one or more previous session events 470 performed by the respective host player profile 460 when hosting a previous session 465. The historic record of session events 470 may include one or more previous session events 470 performed by the respective host player profile 460 when hosting an active session 465 of the subset. In addition, the rank assigner 445 can utilize previous session events 470 performed by host player profiles 460 that have similar attributes to the host player profile 460 of the session. The previous session 465 may be any previous session 465, and not necessarily historic session events that have been performed in one of the active sessions 465 in the identified subset. However, in some implementations, ranking can be based on the historic record of session events 470 that includes one or more previous session events 470 performed by the respective host player profile 460 when hosting an active session 465 of the subset. The rank assigner 445 can generate frequency distributions of the event parameters for the historic session events 470 performed by the host player profiles 460.

The frequency distributions of the session event parameters of historic session events 470 that have been performed by the host player profiles 460 of the subset can be compared to corresponding frequency distributions of the historic event parameters of events performed via the requesting player profile 460. These frequency distributions can indicate the frequency of parameters of events that the requesting player, and the host player profiles identified in the subset, has previously performed. The rank assigner 445 can assign a corresponding rank value (or score) to each of the sessions identified in the subset. To do so, the rank assigner 445 can calculate the score for each session by determining similarity score between the frequency distributions of event parameters of events performed by the host player profile 460, and the frequency distributions of event parameters of events performed using the requesting player profile 460. In some implementations, a factor used to calculate the rank value may be determined based in part on the session attributes of the session 465, such as the remaining time left in a session 465. For example, the rank value may be weighted based on the amount of time remaining in the session 465, such that sessions 465 that are about to expire have a lower ranking than those that have just begun. In some implementations, another factor to calculate the rank value may be determined based on the number of viewers in the session 465. For example, some sessions 465 may be assigned a higher ranking value if the session identifies a greater number of viewers. However, the rank assigner 445 may implement one or more balancing policies to assign higher ranking values to sessions 465 that have fewer viewers, such that the number of viewers across multiple sessions 465 is balanced according to the policy.

In some implementations, the number of events that have been performed in the session 465 can be applied as a weighting value to the rank value, such that the rank value is modified at least in part based on the number of events performed in the session 465. For example, the weight value may be calculated such that sessions 465 in which relatively few events have been performed by the host may be ranked lower than session 465 in which relatively many events have been performed by the host. However, this weight value may be modified further based on a time-based weight value, to compensate for sessions 465 which have just begun and have few events that have been performed. Other weight values may be applied based on user-provided ranking criteria, for example, if the user indicates (e.g., in a request) to rank the subset based on number of viewers, number of events performed, or categories associated with the session 465, among others. In some implementations, when establishing a session 465, the host player profile 460 can specify one or tags (e.g., category identifiers, etc.) for the session 465, which may be stored as part of the one or more session attributes for the session 465. Upon a selection of a particular category identifier or tag (e.g., via one or more user interfaces, the rank assigner 445 can weight rank values of the subset such that the sessions 465 associated with the selected category have greater rank values than sessions 465 that are not associated with the selected category.

In some implementations, the rank assigner 445 or the session identifier 440 can rank or identify sessions 465 using one or more machine learning models. The machine learning models can be any type of machine learning model, including, without limitation, neural networks, convolutional network networks, recurrent neural networks, linear regression models, sparse vector machine (SVM) models, or other types of artificial intelligence models. The machine learning model can be trained output one or more identifiers of active sessions 465, or to otherwise indicate one or more active sessions 465 as relevant to the user. To train the machine learning model, the session processing system 405 can perform one or more backpropagation techniques, or other types of supervised learning techniques, to adjust weights and/or biases of the model to achieve desired accuracy. The machine learning model may be trained, for example, using the attributes of one or more sessions 465 as the input, and whether or not players (using corresponding player profiles 460) accessed the session as the ground-truth data.

Accordingly, the machine learning model can be trained to indicate whether the attributes corresponding to a session 465 indicate that the session should be provided as relevant. In some implementations, the attributes of the player profiles 460 can be used to access the session can also be used as input with the attributes of the previous session 465. This can allow the machine learning model to output whether an active session 465 is relevant to a particular player profile 460. As such, the session identifier 440 may identify sessions 465 having attributes that, when provided as input to the machine learning model, cause the machine learning model to generate an indication that the session 465 is relevant to the requesting player profile 460. The machine learning model may also be trained to output a score value, which indicates the degree of relevancy between a requesting player (e.g., based on the attributes of the corresponding player profile 460) and a session 465. As such, the rank assigner 445 may determine a relevancy score for each of the subset of sessions 465, which may be a factor (e.g., a weight value) for ranking the sessions 465 for display.

Upon calculating the rank value for each of the sessions 465 in the subset, the rank assigner 445 can sort the subset of the sessions 465 according to the ranking values to create a sorted list of the sessions 465. The sorted list of sessions 465 can be stored in association with the requesting player profile 460. The sorted list of sessions 465 can be used to generate a personalized session interface, which can be provided to the client device 420 in response to the request.

The interface generator 450 can generate a personalized session interface having the subset of the one or more active sessions 465 arranged according to the ranking. The personalized session interface may be generated to further include a number of viewers of each active session 465 of the subset. The personalized session interface can include one or more content items 475 that each identifies a respective active session 465 of the ranked subset of active sessions 465. An example of the personalized session interface is described in connection with FIG. 6A. To generate the personalized session interface, the interface generator 450 can generate display instructions to display each content item corresponding to each active session 465 of the subset. Generating display instructions can include allocating and populating one or more data structures for each content item 475, which include attributes of each session 465 in the subset. For example, each content item 475 can indicate any of the attributes of the session 465, including a number of viewers of the active session 465, a number of events associated with the session 465, an indication of a social media relationship (e.g., followed, friend, etc.) with the host of the active session 465. The display instructions can also be generated to indicate the order that the content items 475 should be displayed in the personalized session interface, such that the content items 475 are arranged in the personalized interface as an ordered list, grid, or other ordered arrangement of content items 475. Each of the content items 475 can include instructions that indicate the content item 475 is an interactive user interface element, that when interacted with, causes the client device 420 displaying the content item 475 to transmit a request to join the active session 465 identified by the content item 475.

The interface provider 455 can provide, to the requesting client device 420, the personalized session interface to cause the client device 420 to display a list of the subset of the plurality of active sessions 465 according to the ranking. Once the display instructions for the personalized interface have been generated, the interface provider 450 can transmit the display instructions to the client device 420. The application at the client device 420 can receive and parse the instructions, and display the content items corresponding to the subset of the active sessions 465 in order of their ranking. An example personalized interface is described in connection with FIG. 6A. As described herein, one or more of the content items 475 can include interactive user interface elements that, when selected, cause the client device 420 to transmit a request to join the active session 465 represented by the content item 475.

Figure 5:
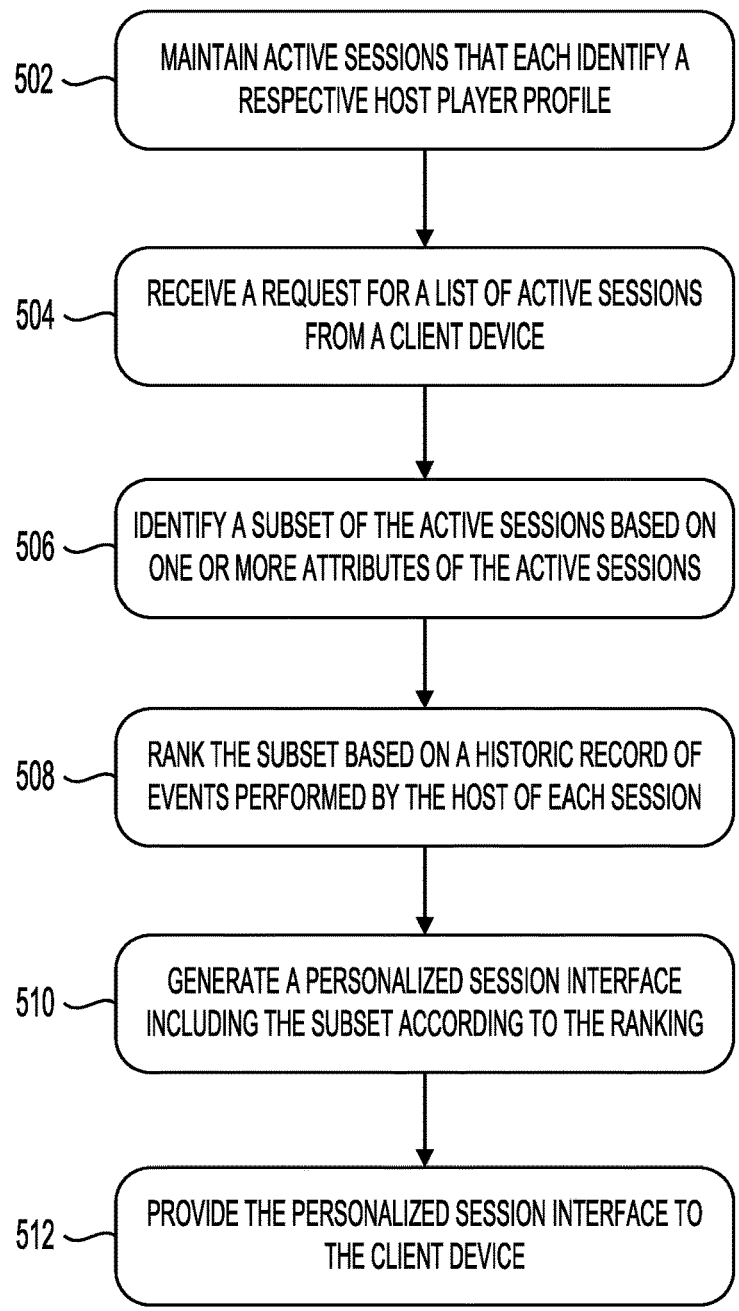
FIG. 5 illustrates an example flow diagram of a method for generating session interfaces based on session events and player profile attributes, in accordance with one or more implementations.

Referring now to FIG. 5, depicted is an illustrative flow diagram of a method 500 for generating session interfaces based on session events and player profile attributes. The method 500 can be executed, performed, or otherwise carried out by the session processing system 205 described in connection with FIG. 2, the session processing system 405 described in connection with FIG. 4, the computer system 100 described in connection with FIGS. 1A-1D, or any other computing devices described herein. In brief overview, the method can include maintaining active sessions that each identify a corresponding host player profile (STEP 502), receiving a request for a list of active sessions from a client device (STEP 504), identifying a subset of the active sessions based on one or more attributes of the active sessions (STEP 506), ranking the subset based on a historic record of events performed by the host of each session (STEP 508), generating a personalized session interface including a subset according to the ranking (STEP 510), and providing the personalized session interface to the requesting client device (STEP 512).

In further detail of the method 500, at step 502, the method 500 can include maintaining one or more active sessions (e.g., the sessions 465). Each session can identify a respective host player profile (e.g., a player profile 460 that is hosting the active session 465). Each of the one or more active sessions may be associated with one or more session attributes, as described herein. The session processing system can store, and update, a list of active sessions. Active sessions are sessions that have been established and have not yet been terminated, and are actively monitored and updated by the session processing system, as described in connection with Section B. Each of the active sessions can be stored in association with one or more session events (e.g., the session events 470) that are performed via the host player profile during the respective session. The session processing system can establish one or more sessions in response to a request from a client device (e.g., a client device 420).

The request may identify the host player profile as a host of the session. The request can be transmitted by a client device, for example, via an application executing on the client device. The application can be used to access the functionality of the session processing system using a player profile. As described herein, the client device may utilize login credentials or other forms of authentication to access the functionality of the session processing system with the corresponding player profile. The application executing on the client device can present one or more interactive user interface elements on a display of the client device, such as the user interface elements described in connection with FIGS. 6A-6D. When an interaction is detected with one of the user interface elements (e.g., a "Start Session" user interface element, etc.), the client device can transmit a corresponding request to establish a session, with the player profile used by the client device to access the functionality of the session process system as the host of the session. The player profile that is identified as the host of the session is referred to herein as the "host player profile."

As described herein, a session can be a feed or a record of actions that are performed via the host player profile, which may be updated and synchronized in real-time or near real-time with other player profiles that are accessing the session as viewers. Player profiles that access the functionality of the session processing system as a viewer of a session can be referred to herein as "viewer player profiles." The request to establish the session can include one or more session attributes, which may include categories associated with the session (e.g., a particular sporting event, a type of sport, a type of events that typically occur during the session, etc.). The session attributes of the session may also include a duration of the session, which indicates the amount of time that the session should be run at the session processing system. The session duration may be specified in the request to establish the session.

To establish the session, the session processing system can allocate one or more regions of memory, for example, in a database (e.g., the storage 415), for one or more data structures that will include information related to the established session (e.g., the sessions 465). Establishing the session can include assigning a unique identifier to the session, and populating one or more data structures of allocated for the session with an identifier of the player profile used to request establishment of the session. That player profile can be stored as a host player profile. The data structures for the session can be further populated with the attributes of the session provided in the request, such as the session duration or any types categories associated with the session, among others. Once the data structures corresponding to the session have been populated, the session can be established by setting a flag associated with the created session to "active," and updating a list of active sessions that are managed by the session processing system to include the established session. As described herein, sessions on the list of active sessions can be monitored, updated, and used to generate notifications and records corresponding to events performed during each session using the respective host player profile. In addition, lists of active sessions may be displayed to potential viewers of the session in response to one or more requests.

At step 504, the method 500 can include receiving, from a client device associated with a player profile, a request for a list of active sessions. The request can identify the player profile associated with the client device (sometimes referred to as the "requesting player profile"). In some implementations, the request can include a request for a predetermined number of active sessions (e.g., ten active sessions, twenty active sessions, etc.). The request for the list of active sessions can be transmitted by an application associated with the session processing system, and that executes on the client device. In response to the request, the session processing system can perform further steps of the method 500 to identify, rank, and transmit a list of active sessions to the application. The lists of active sessions can be or may include, for example, one or more content items (e.g., the content items 475). An example list of active sessions is described in connection with FIG. 6A. The request may identify a group of host player profiles for use in generating the list of active sessions. For example, the request may indicate that the session processing system should return active sessions identifying host player profiles that the player follows (e.g., as indicated in the player profile associated with the request).

The request for the list of active sessions may be transmitted by a client device in response to an interaction with a corresponding interactive user interface element displayed by the application. For example, a user interface of the application may include a "Social" button, or another button (e.g., "All Users," "Following," etc.) which specify a group of host player profiles to access when identifying the list of active session. Upon selection of the interactive user interface element, the application executing on the client device can transmit the request to the session processing system. Upon receiving the request, the session processing system can reduce the list of all active sessions monitored by the session processing system to a smaller subset using the techniques described herein. This reduces the overall network traffic and resource consumption at the session processing system, by automatically generating a record without requiring a client device to transmit a request to do so.

At step 506, the method 500 can include identifying a subset of the one or more active sessions based on the one or more session attributes of each of the one or more active sessions. As described herein, the session processing system can maintain a list of active sessions, which may each be associated with a respective set of session attributes. Some non-limiting examples of session attributes can include session duration, a number of player profiles identified as viewers of the session, an identifier of host player profile of the session, a number of session events 270 that have been performed via the session, an amount of time before the session will expire, a timestamp corresponding to when the session was established, an identifier of an event type associated with the session, a category identifier associated with the session and any event parameters of any session event performed during the session.

To reduce the number of the active sessions that are required to be provided to the user, the session processing system can filter the one or more active sessions according to various criteria (e.g., filtering rules). The filtering rules can be applied to any of the attributes of the active session. The subset of the active sessions may be identified based on the amount of time remaining in the session (e.g., the amount of time left). For example, the session processing system may identify the subset as comprising active sessions that have at least a predetermined amount of time until the session expires. In this way, sessions that are about to expire may not be provided to a player when the player requests a list of active sessions via the client device. Similarly, the request for active sessions may itself include one or more criteria. For example, the request for the list of active sessions may specify one or more desired attributes for the session, such as event type, category, topic, duration, number of viewers, or number of session events, among others. The session processing system can compare the provided criteria to the attributes of each active session, and identify the subset as the active sessions that satisfy the specified criteria. In some implementations, the session processing system may utilize a predetermined or default criteria for identifying the subset of the sessions. In some implementations, the request may include a string of characters as a search query, which the session processing system can use to filter to active sessions identifying a host player profile name that matches the search query. For example, the session processing system can utilize one or more string matching algorithms to filter the one or more active sessions to the subset, such as fuzzy string matching.

In some implementations, the session processing system can identify the subset in part based on the attributes of the player profile associated with the client device that transmitted the request. As described herein, the player profile attributes may include, for example, a credit balance and wager information associated with the player profile (e.g., an amount of each wager, a timestamp associated with each wager, information about the presence of an indication to participate in a bonus opportunity using the wager, a client device identifier of a client device 220 that was used to place the wager, etc.), as well as historic records of online activity (e.g., the session events 470) that the player has performed using the corresponding player profile (and any event parameters associated therewith). The attributes of the player profile can include a list or table of previous sessions accessed via the player profile 260 as a viewer, and any session attributes associated with those sessions. For example, the list can include a list of identifiers of the previously accessed sessions, records of one or more session events (e.g., wagers, player profile 260 modifications, social media actions, etc.) that the player has performed while accessing the session (e.g., including any session events 270 that were performed automatically or that were generated based on session events 270 performed by the host during the corresponding session 265) as a viewer.

The session processing system can identify the subset of the one or more active sessions further based on the one or more player attributes of the player profile. For example, can access the list of historic sessions accessed using the player profile to determine frequency distributions of the attributes of historic sessions that have been recently (e.g., based on the timestamp of the historic session) been accessed using the player profile. These frequency distributions can indicate the frequency of attributes of sessions that the player has previously accessed. The session processing system can identify active sessions for inclusion in the subset that include attributes that match attributes of historic sessions accessed using the player profile. In some implementations, the session processing system can identify active sessions for the subset that include attributes that match the most frequent (e.g., a frequency that is greater than a predetermined threshold, a top number of most frequent attributes, etc.) attributes of sessions previously accessed using the player profile.

In some implementations, the player profiles may indicate associations with other player profiles. For example, by transmitting corresponding requests via the user interfaces provided by the client application, the player can create an association between their player profile and another specified player profile. The associations can be one-way associations (e.g., a follow association) to two-way associations (e.g., a social media friend association). In some implementations, the session processing system can identify the subset of the one or more active sessions based on these associations indicated in the player profile. For example, the request for the list of active sessions can include an indication that the subset should include active sessions that are hosted using player profiles that the requesting player profile has followed. To accommodate this request, the session processing system can identify the subset of the active sessions as the active sessions that are hosted using player profiles that are indicated as "followed" by the requesting player profile. Similar processes can be performed to identify active sessions hosted by "friends" (e.g., a friend association indicated in the player profiles) of the requesting player profile.

At step 508, the method 500 can include ranking the subset of the plurality of active sessions based on a historic record of events performed via the respective host player profile of each active session of the subset, and based on one or more player attributes of the player profile. The historic record of events (e.g., the session events of historic sessions maintained by the session processing system) can include one or more previous session events performed by the respective host player profile when hosting a previous session. The previous session may be any previous session, and not necessarily historic session events that have been performed in one of the active sessions in the identified subset. However, in some implementations, ranking can be based on the historic record of events that includes one or more previous events performed by the respective host player profile when hosting an active session of the subset. The session processing system can generate frequency distributions of the event parameters for the historic events performed by the host player profiles.

The frequency distributions of the session event parameters of historic session events that have been performed by the host player profiles of the subset can be compared to corresponding frequency distributions of the historic event parameters of events performed via the requesting player profile. These frequency distributions can indicate the frequency of parameters of events that the requesting player, and the host player profiles identified in the subset, has previously performed. The session processing system can assign a corresponding rank value (or score) to each of the sessions identified in the subset. To do so, the session processing system can calculate the score for each session by determining similarity score between the frequency distributions of event parameters of events performed by the host player profile, and the frequency distributions of event parameters of events performed using the requesting player profile. In some implementations, a factor used to calculate the rank value may be determined based in part on the session attributes of the session, such as the remaining time left in a session. For example, the rank value may be weighted based on the amount of time remaining in the session, such that sessions that are about to expire have a lower ranking than those that have just begun. In some implementations, another factor to calculate the rank value may be determined based on the number of viewers in the session. For example, some sessions may be assigned a higher ranking value if the session identifies a greater number of viewers. However, the session processing system may implement one or more balancing policies to assign higher ranking values to sessions that have fewer viewers, such that the number of viewers across multiple sessions is balanced according to the policy.

In some implementations, the number of events that have been performed in the session can be applied as a weighting value to the rank value, such that the rank value is modified at least in part based on the number of events performed in the session. For example, the weight value may be calculated such that sessions in which relatively few events have been performed by the host may be ranked lower than session in which relatively many events have been performed by the host. However, this weight value may be modified further based on a time-based weight value, to compensate for sessions which have just begun and have few events that have been performed. Other weight values may be applied based on user-provided ranking criteria, for example, if the user indicates (e.g., in a request) to rank the subset based on number of viewers, number of events performed, or categories associated with the session, among others. In some implementations, when establishing a session, the host player profile can specify one or tags (e.g., category identifiers, etc.) for the session, which may be stored as part of the one or more session attributes for the session. Upon a selection of a particular category identifier or tag (e.g., via one or more user interfaces, the session processing system can weight rank values of the subset such that the sessions associated with the selected category have greater rank values than sessions that are not associated with the selected category.

Upon calculating the rank value for each of the sessions in the subset, the session processing system can sort the subset of the sessions according to the ranking values to create a sorted list of the sessions. The sorted list of sessions can be stored in association with the requesting player profile. The sorted list of sessions can be used to generate a personalized session interface, which can be provided to the client device in response to the request.

At step 510, the method 500 can include generating a personalized session interface having the subset of the one or more active sessions arranged according to the ranking. The personalized session interface can include one or more content items that each identifies a respective active session of the ranked subset of active sessions. An example of the personalized session interface is described in connection with FIG. 6A. To generate the personalized session interface, the session processing system can generate display instructions to display each content item corresponding to each active session of the subset. Generating display instructions can include allocating and populating one or more data structures for each content item, which include attributes of each session in the subset. For example, each content item can indicate any of the attributes of the session, including a number of viewers of the active session, a number of events associated with the session, an indication of a social media relationship (e.g., followed, friend, etc.) with the host of the active session. The display instructions can also be generated to indicate the order that the content items should be displayed in the personalized session interface, such that the content items are arranged in the personalized interface as. Each of the content items can include instructions that indicate the content item is an interactive user interface element, that when interacted with, causes the client device displaying the content item to transmit a request to join the active session identified by the content item.

At step 512, the method 500 can include providing, to the client device, the personalized session interface to cause the client device to display a list of the subset of the plurality of active sessions according to the ranking. Once the display instructions for the personalized interface have been generated, the session processing system can transmit the display instructions to the client device. The application at the client device can receive and parse the instructions, and display the content items corresponding to the subset of the active sessions in order of their ranking. An example personalized interface is described in connection with FIG. 6A. As described herein, one or more of the content items can include interactive user interface elements that, when selected, cause the client device to transmit a request to join the active session represented by the content item.

Figure 6A:
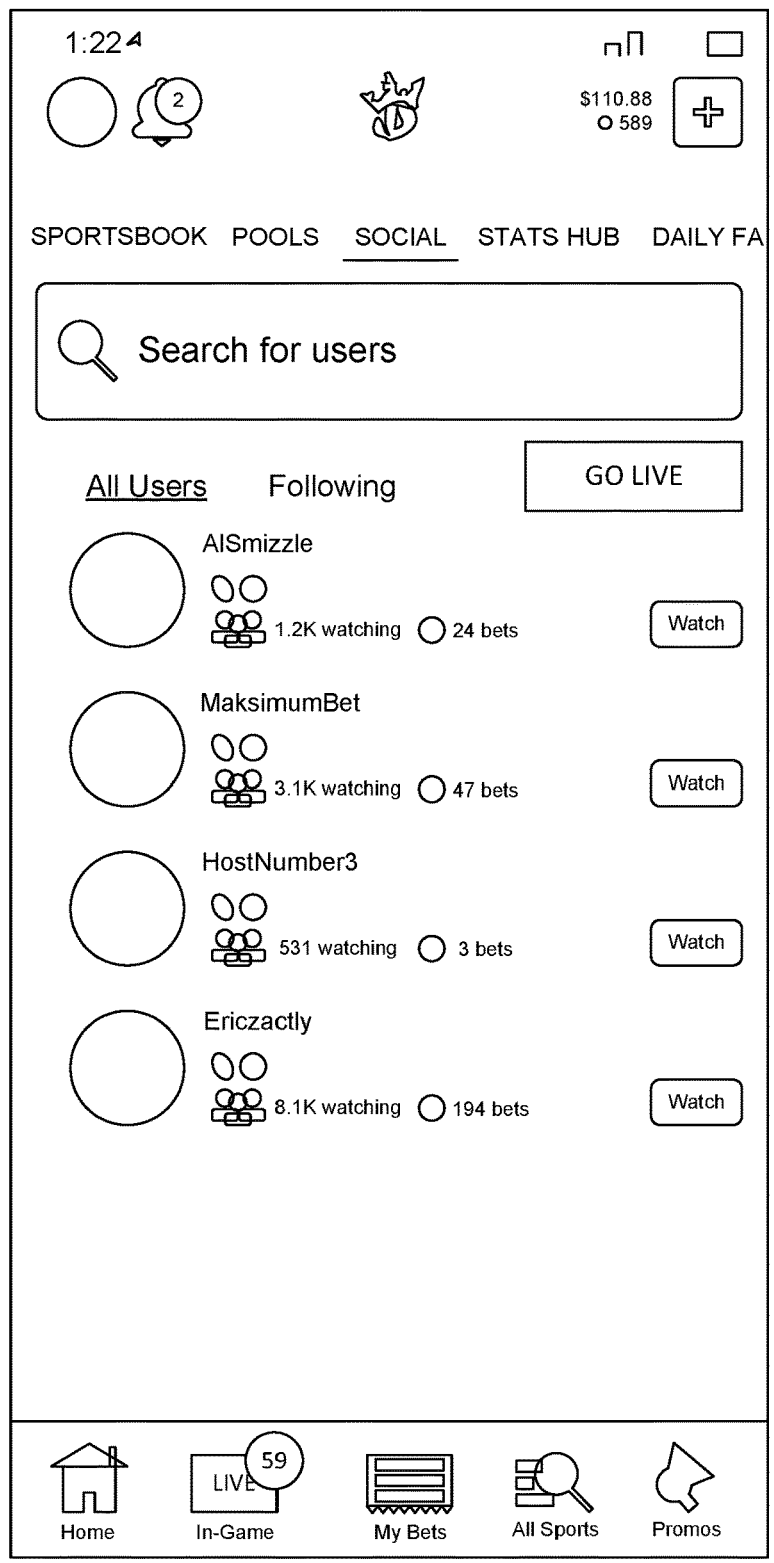
FIGS. 6A, 6B, 6C, and 6D illustrate example user interfaces that show various user interface elements associated with the techniques described herein, in accordance with one or more implementations.
Figure 6B:
Figure 6C:
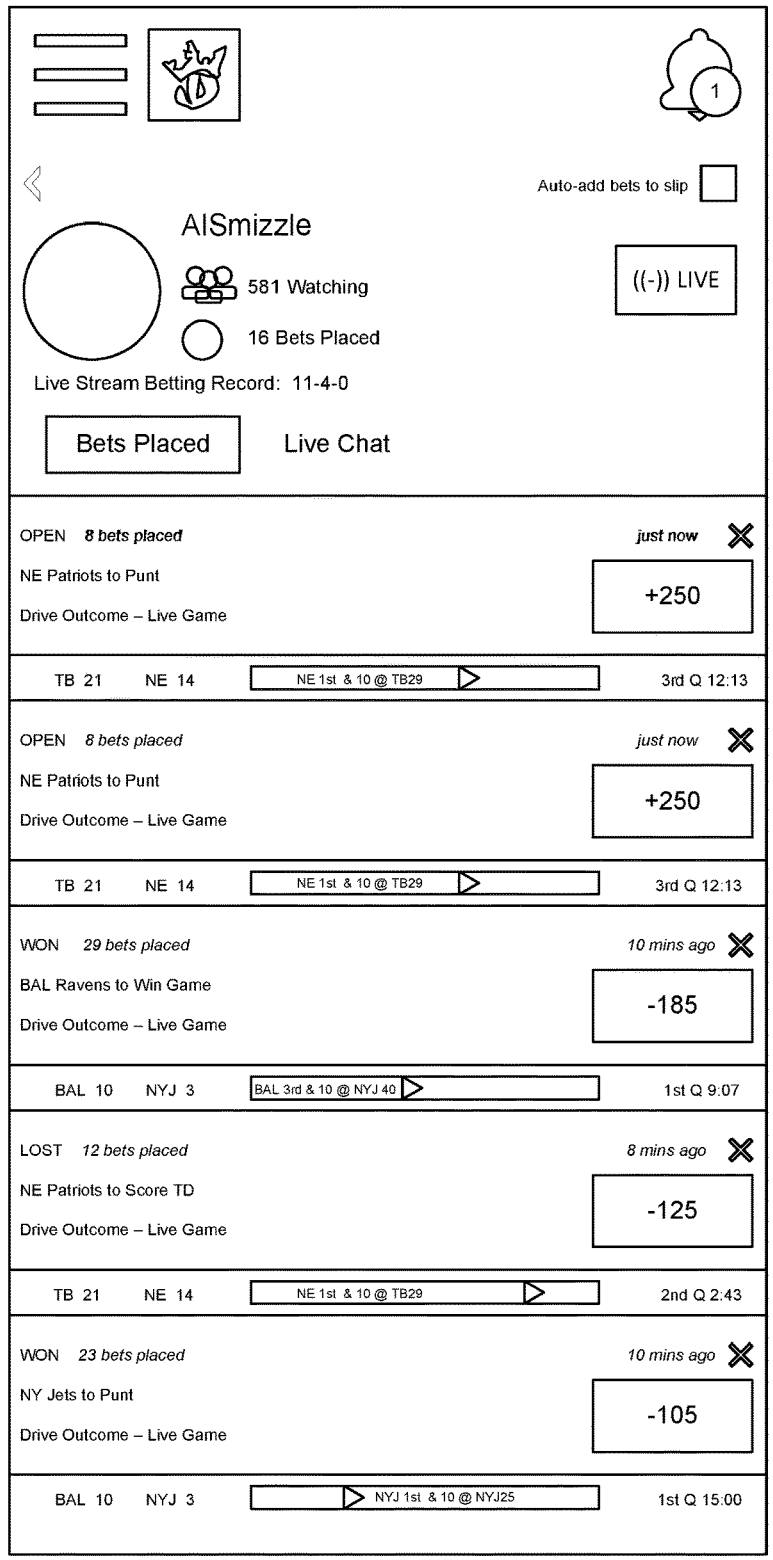
Figure 6D:
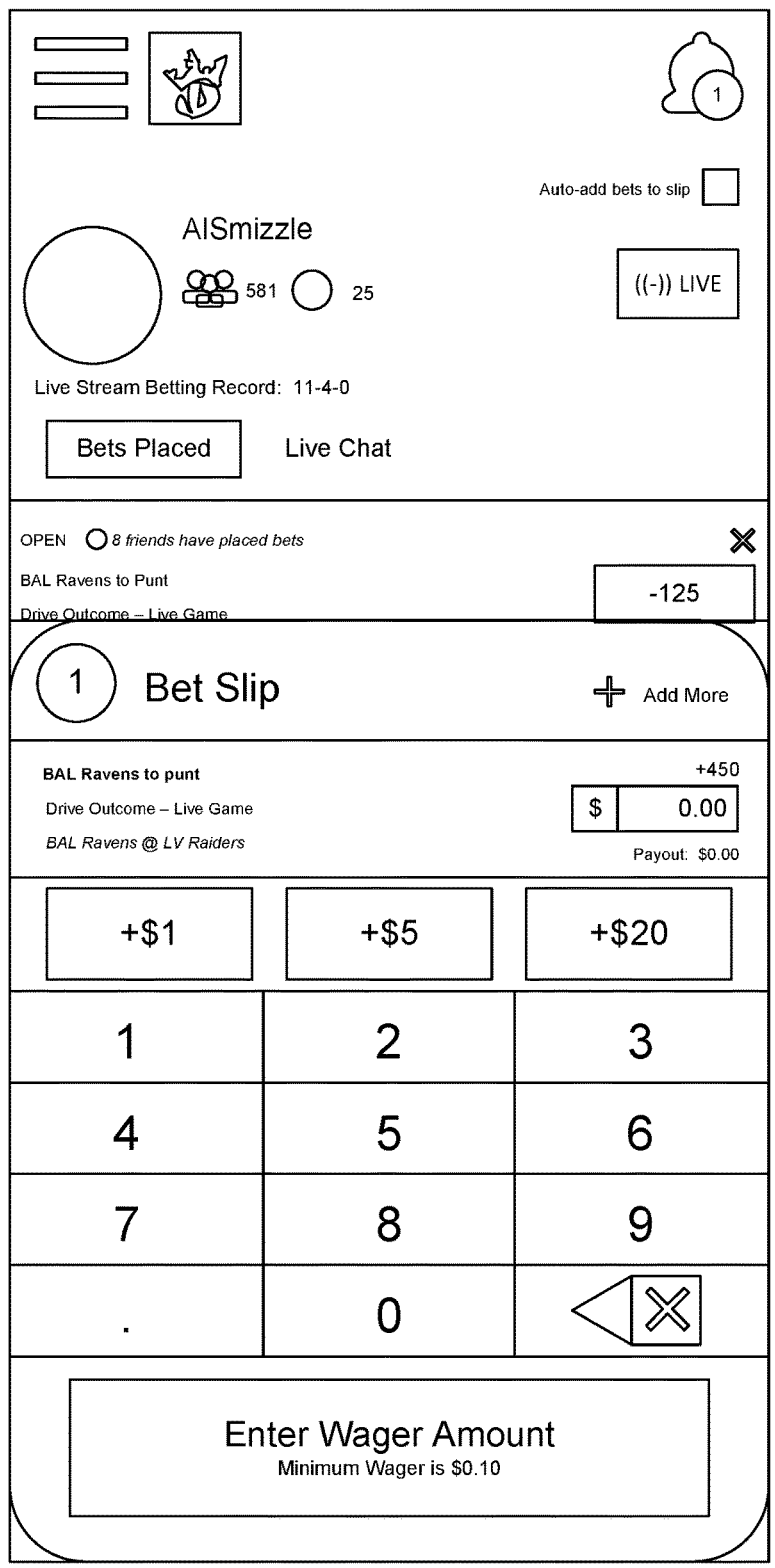

Referring now to FIGS. 6A-6D, depicted are example user interfaces that can be displayed by an application executing on a client device (e.g., the client device 220 or the client device 420, etc.). The application can be associated with, and communicate with, the session processing system via one or more networks (e.g., the network 210 or the network 410). Referring to FIG. 6A, depicted is an example user interface 600A of the application which includes a personalized session interface. As shown, the user interface includes user interface elements to search for users, to view sessions from the set of all player profiles of the session processing system (e.g., "All Users"), and to view sessions from the set of player profiles that the player accessing the application follows (e.g., "Following"). In addition, the interface includes a "Go Live" button, which when interacted with, causes the application to display another user interface for the player to provide one or more session attributes for a new session. Below these interactive user interface elements is personalized session interface, generated using the techniques described herein, which shows a ranked list of active sessions (e.g., each represented by a content item). As shown, each active session in the list includes an identifier of the host of the session, a number of viewers of the session, a number of session events that have been performed by the host during the session, and an interactive user interface element that, when interacted with, causes the application to transmit a request to join the active session (e.g., the "Watch" button).

If an interaction with the "Go Live" button is interacted with, the application can present the user interface depicted in FIG. 6B. Referring to FIG. 6B, depicted is an example user interface 600B that includes interactive user interface elements that allow a player to indicate one or more session attributes for a new live session. As shown, the user interface 600B includes one or more interactive elements that allow a player to select one or more categories or topics. In addition, the user may provide a URL that may be published in the user interface of their respective live session. A drop-down box, or another user interface element, is also present that can receive a specified duration for the session. Once these selections have been made, the "Start Session" button can be activated (e.g., made interactive), and when this button is actuated, the application can transmit a request to the session processing system to establish the session with the specified attributes. Although only a few session attributes are provided, it should be understood that any number or variety of attributes may be specified through similar user interfaces.

An example of a session is shown in FIG. 6C. Referring to FIG. 6C, depicted is an example user interface 600C that is presented to a viewer of a joined session. As shown, the user interface 600C includes a user interface element that indicates the player intends for records to be automatically generated in response to session events (e.g., the session events 270) performed by the host during the session (e.g., the "Auto-add bets to slip" check-box). In addition, the session includes an indication the session is active (e.g., the "((-)) Live" indicator). Various session attributes may also be displayed in the user interface 600C. The user interface 600C can also display a live chat (not shown), in which the various viewers of the chat (and the host of the chat) can transmit one or more messages, which can be recorded as session events (e.g., the session events 270 and the session events 470) of the session. These live chat messages can be displayed upon selecting the "Live Chat" button. An interaction with the "Bets Placed" button can cause a feed of content items representing other session events performed by the host during the session to be displayed. Below these user interface elements, as shown, is a feed of content items that each show session events and session event parameters (e.g., wager amount, number of wagers placed, time of the session event, sports teams associated with the session event, scores of a live event associated with the session event, a time until the session event has expired, and status of the session event, among others).

As described herein, in some implementations, upon detecting an interaction with a session event in the feed of content items, the application transmits an indication to the session processing system to generate a record for the player profile of the client device that corresponds to the session event. An example of such techniques is shown in FIG. 6D, which shows user interface 600D including a corresponding wager session event being provided to a viewer in response to an interaction. As shown, if the session event is a wager, the player can be prompted to modify one or more event parameters of the wager, such as the wager amount. Other suitable user interfaces may be displayed to accommodate different types of session events. Upon providing the modified event parameters wager amount, the application executing on the client device can transmit a request to perform the corresponding event to the session processing system (e.g., in this case, to place a corresponding wager of a specified amount).

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus," "data processing system," "client device," "computing platform," "computing device," or "device" encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive, data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor for displaying information to the user, and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the session processing system 205 can include clients and servers. For example, the session processing system 205 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a user interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the session processing system 205 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for synchronizing client data structures with session events, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
    establishing, by one or more processors coupled to memory, a session in response to a request from a host client device associated with a host player profile, the request identifying the host player profile as a host of the session, the session identifying a time period during which events are shared with viewers of the session;
    configuring, by the one or more processors, the host player profile to share records of events performed via the host player profile during the time period indicated in the session;
    receiving, by the one or more processors from a plurality of viewer client devices, a plurality of requests to join the session, each request associated with a respective viewer player profile;
    responsive to the plurality of viewer client devices joining the session, transmitting, by the one or more processors, a plurality of content items for presentation at the plurality of viewer client devices in a session feed of the session, each of the plurality of content items identifying a respective event previously performed via the host player profile during the session, each content item of the plurality of content items identifying a respective status of the respective event and a respective amount of time remaining for the respective event;
    receiving, by the one or more processors from a viewer client device of the plurality of viewer client devices, a request to permit automatic population of records corresponding to events performed via the host player profile during the session;
    detecting, by the one or more processors, an event performed via the host player profile during the time period of the session, the event identifying a plurality of event parameters;
    transmitting, by the one or more processors, a content item identifying the event for presentation in a user interface of the session at the plurality of viewer client devices, the content item provided for display as part of the plurality of content items in the session feed of the session at the plurality of viewer client devices, the content item identifying the event and an amount of time remaining for the event;
    in response to an interaction with the content item within the amount of time remaining for the event, providing, by the one or more processors to the viewer client device, instructions to cause the viewer client device to present a second user interface including a subset of the plurality of event parameters and at least one field that receives a wager amount as an input via the viewer client device; and
    generating, by the one or more processors, in the viewer player profile, a record corresponding to the event responsive to determining that the viewer player profile includes an indication to permit automatic population of records and responsive to a second interaction with the second user interface, the record used to enable performance of a corresponding event having the subset of the plurality of event parameters and the wager amount via the viewer player profile.

2. The method of claim 1, further comprising terminating, by the one or more processors, the session responsive to detecting that the time period of the session has expired.

3. The method of claim 1, wherein the request to permit automatic population of the records comprises an indication that corresponding events are to be performed responsive to automatic populating of the records.

4. The method of claim 1, further comprising maintaining, by the one or more processors, the session feed of the session comprising the plurality of content items including the content item as part of the session.

5. The method of claim 4, further comprising transmitting, by the one or more processors, the session feed comprising the plurality of content items to an additional client device associated with an additional player profile responsive to the additional player profile joining the session as a viewer.

6. The method of claim 1, further comprising updating, by the one or more processors, a data structure associated with the session to identify the respective viewer player profile of each of the plurality of viewer client devices.

7. The method of claim 1, further comprising:
receiving, by the one or more processors from the viewer client device, a request to leave the session; and
updating, by the one or more processors, the viewer player profile to remove the indication to permit automatic population of records corresponding to events performed via the host player profile during the session.

8. The method of claim 1, further comprising receiving, by the one or more processors, an event parameter limit corresponding to a first event parameter of the plurality of event parameters; and
wherein generating the record corresponding to the event in the viewer player profile further comprises generating the record to enable performance of the corresponding event based on the event parameter limit.

9. The method of claim 1, further comprising:
detecting, by the one or more processors, a change to a first parameter of the plurality of event parameters of the corresponding event; and
transmitting, by the one or more processors to the viewer client device, a change notification that indicates the change in the first parameter of the plurality of event parameters.

10. A system, comprising:
one or more processors coupled to memory, the one or more processors configured to:
establish a session in response to a request from a host client device associated with a host player profile, the request identifying the host player profile as a host of the session, the session identifying a time period during which events are shared with viewers of the session;
configure the host player profile to share records of events performed via the host player profile during the time period indicated in the session;
receive, from a plurality of viewer client devices, a plurality of requests to join the session, each request associated with a respective viewer player profile;
responsive to the plurality of viewer client devices joining the session, transmit a plurality of content items for presentation at the plurality of viewer client devices in session feed of the session, each of the plurality of content items identifying a respective event previously performed via the host player profile during the session, each content item of the plurality of content items identifying a respective status of the respective event and a respective amount of time remaining for the respective event;
receive, from a viewer client device of the plurality of viewer client devices, a request to permit automatic population of records corresponding to events performed via the host player profile during the session;
detect an event performed via the host player profile during the time period of the session, the event identifying a plurality of event parameters;
transmit a content item identifying the event for presentation in a user interface of the session at the plurality of viewer client devices, the content item provided for display as part of the plurality of content items in the session feed of the session at the plurality of viewer client devices, the content item identifying the event and an amount of time remaining for the event;
in response to an interaction with the content item within the amount of time remaining for the event, providing, by the one or more processors to the viewer client device, instructions to cause the viewer client device to present a second user interface including a subset of the plurality of event parameters and at least one field that receives a wager amount as an input via the viewer client device; and
generate, in the viewer player profile, a record corresponding to the event responsive to determining that the viewer player profile includes an indication to permit automatic population of records and responsive to a second interaction with the second user interface, the record used to enable performance of a corresponding event having the subset of the plurality of event parameters and the wager amount via the viewer player profile.

11. The system of claim 10, wherein the one or more processors are further configured to terminate the session responsive to detecting that the time period of the session has expired.

12. The system of claim 10, wherein the request to permit automatic population of the records comprises an indication that corresponding events are to be performed responsive to automatic populating of the records.

13. The system of claim 10, wherein the one or more processors are further configured to maintain the session feed of the session comprising the plurality of content items including the content item.

14. The system of claim 13, wherein the one or more processors are further configured to transmit the session feed comprising the plurality of content items to an additional client device associated with an additional player profile responsive to the additional player profile joining the session as a viewer.

15. The system of claim 10, wherein the one or more processors are further configured to update a data structure associated with the session to identify the respective viewer player profile of each of the plurality of viewer client devices.

16. The system of claim 10, wherein the one or more processors are further configured to:
receive, from the viewer client device, a request to leave the session; and update the viewer player profile to remove the indication to permit automatic population of records corresponding to events performed via the host player profile during the session.

17. The system of claim 10, wherein the one or more processors are further configured to receive an event parameter limit corresponding to a first event parameter of the plurality of event parameters; and wherein generating the record corresponding to the event in the viewer player profile further comprises generating the record to enable performance of the corresponding event based on the event parameter limit.

18. The system of claim 10, wherein the one or more processors are further configured to:

detect a change to a first parameter of the plurality of event parameters of the corresponding event; and transmit, to the viewer client device, a change notification that indicates the change in the first parameter of the plurality of event parameters.

* * * * *